United States Patent
Roberts et al.

(10) Patent No.: US 9,142,864 B2
(45) Date of Patent: Sep. 22, 2015

(54) ELECTROLYTES FOR RECHARGEABLE BATTERIES

(75) Inventors: Gregory Alan Roberts, Oakland, CA (US); Rainer J Fasching, Mill Valley, CA (US); Constantin I Stefan, San Jose, CA (US)

(73) Assignee: Amprius, Inc., Sunnyvale, CA (US)

(*) Notice: Subject to any disclaimer, the term of this patent is extended or adjusted under 35 U.S.C. 154(b) by 0 days.

(21) Appl. No.: 13/296,753

(22) Filed: Nov. 15, 2011

(65) Prior Publication Data
US 2012/0121989 A1    May 17, 2012

Related U.S. Application Data

(60) Provisional application No. 61/413,888, filed on Nov. 15, 2010.

(51) Int. Cl.
*H01M 4/36* (2006.01)
*H01M 4/38* (2006.01)
*H01M 10/0569* (2010.01)
(Continued)

(52) U.S. Cl.
CPC ........... *H01M 10/0569* (2013.01); *B82Y 30/00* (2013.01); *H01M 4/0428* (2013.01); *H01M 4/134* (2013.01); *H01M 4/386* (2013.01); *H01M 4/483* (2013.01); *H01M 10/052* (2013.01); *H01M 10/0568* (2013.01); *H01M 2300/0034* (2013.01); *H01M 2300/0037* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 4,436,796 A | 3/1984 | Huggins et al. | |
| 5,457,343 A | 10/1995 | Ajayan | |

(Continued)

FOREIGN PATENT DOCUMENTS

| | | |
|---|---|---|
| CN | 101346834 | 1/2009 |
| EP | 845828 | 10/2002 |

(Continued)

OTHER PUBLICATIONS

Chan, High-performance lithium battery anodes using silicon nanowires, Nature Nanotechnology, Jan. 2008, vol. 3, pp. 31-35.*

(Continued)

*Primary Examiner* — Cynthia K Walls

(57) ABSTRACT

Provided are novel electrolytes for use in rechargeable lithium ion cells containing high capacity active materials, such as silicon, germanium, tin, and/or aluminum. These novel electrolytes include one or more pyrocarbonates and, in certain embodiments, one or more fluorinated carbonates. For example, dimethyl pyrocarbonate (DMPC) may be combine with mono-fluoroethylene carbonate (FEC). Alternatively, DMPC or other pyrocarbonates may be used without any fluorinated carbonates. A weight ratio of pyrocarbonates may be between about 0% and 50%, for example, about 10%. Pyrocarbonates may be combined with other solvents, such as ethylene carbonate (EC), propylene carbonate (PC), dimethyl carbonate (DMC), diethyl carbonate (DEC), and/or ethylmethyl carbonate (EMC). Alternatively, pyrocarbonates may be used without such solvents. Experimental results conducted using electrochemical cells with silicon based electrodes demonstrated substantial improvements in cycle life when pyrocarbonate containing electrolytes were used in comparison with pyrocarbonate free electrolytes.

23 Claims, 8 Drawing Sheets

(51) Int. Cl.
*B82Y 30/00* (2011.01)
*H01M 4/04* (2006.01)
*H01M 4/134* (2010.01)
*H01M 4/48* (2010.01)
*H01M 10/052* (2010.01)
*H01M 10/0568* (2010.01)

(56) References Cited

U.S. PATENT DOCUMENTS

| | | | |
|---|---|---|---|
| 5,997,832 A | 12/1999 | Lieber | |
| 6,083,644 A | 7/2000 | Watanabe et al. | |
| 6,232,020 B1* | 5/2001 | Song et al. | 429/326 |
| 6,334,939 B1 | 1/2002 | Zhou | |
| 6,423,453 B1 | 7/2002 | Noda | |
| 6,514,395 B2 | 2/2003 | Zhou | |
| 6,667,099 B1 | 12/2003 | Greiner et al. | |
| 7,189,476 B1 | 3/2007 | Macklin et al. | |
| 7,402,829 B2 | 7/2008 | Green | |
| 7,408,829 B2 | 8/2008 | Kuang et al. | |
| 7,682,750 B2 | 3/2010 | Chen | |
| 7,704,480 B2 | 4/2010 | Jiang et al. | |
| 8,017,272 B2 | 9/2011 | Feng et al. | |
| 8,241,372 B2 | 8/2012 | Cheng et al. | |
| 8,252,245 B2 | 8/2012 | Tonkovich et al. | |
| 8,257,866 B2 | 9/2012 | Loveness et al. | |
| 8,263,258 B2 | 9/2012 | Nakazato et al. | |
| 8,450,012 B2 | 5/2013 | Cui et al. | |
| 2002/0148727 A1 | 10/2002 | Zhou et al. | |
| 2003/0175589 A1 | 9/2003 | Kaminaka et al. | |
| 2003/0203139 A1 | 10/2003 | Ren et al. | |
| 2004/0126659 A1 | 7/2004 | Graetz | |
| 2005/0100793 A1 | 5/2005 | Jonghe et al. | |
| 2005/0153208 A1 | 7/2005 | Konishiike et al. | |
| 2005/0196670 A1* | 9/2005 | Yamaguchi et al. | 429/200 |
| 2005/0238810 A1 | 10/2005 | Scaringe et al. | |
| 2005/0279274 A1 | 12/2005 | Niu et al. | |
| 2006/0040182 A1 | 2/2006 | Kawakami et al. | |
| 2006/0066201 A1 | 3/2006 | Ra et al. | |
| 2006/0097691 A1 | 5/2006 | Green | |
| 2006/0147797 A1 | 7/2006 | Wu et al. | |
| 2006/0154141 A1 | 7/2006 | Salot et al. | |
| 2006/0165988 A1 | 7/2006 | Chiang et al. | |
| 2006/0204853 A1 | 9/2006 | Chen | |
| 2006/0216603 A1 | 9/2006 | Choi | |
| 2006/0261134 A1 | 11/2006 | Ho | |
| 2007/0095276 A1 | 5/2007 | Sunkara et al. | |
| 2007/0154808 A1 | 7/2007 | Konishiike et al. | |
| 2007/0154810 A1 | 7/2007 | Kim et al. | |
| 2007/0190422 A1 | 8/2007 | Morris | |
| 2008/0044732 A1 | 2/2008 | Salot et al. | |
| 2008/0145762 A1 | 6/2008 | Adachi et al. | |
| 2008/0213603 A1 | 9/2008 | Kobayashi et al. | |
| 2008/0274403 A1 | 11/2008 | Kim et al. | |
| 2008/0280169 A1 | 11/2008 | Niu et al. | |
| 2008/0280207 A1 | 11/2008 | Patoux et al. | |
| 2009/0004566 A1 | 1/2009 | Shirane et al. | |
| 2009/0042102 A1 | 2/2009 | Cui et al. | |
| 2009/0068553 A1 | 3/2009 | Firsich | |
| 2009/0169996 A1 | 7/2009 | Zhamu | |
| 2009/0188544 A1 | 7/2009 | Kobayashi et al. | |
| 2009/0214942 A1 | 8/2009 | Frank et al. | |
| 2009/0246628 A1 | 10/2009 | Adachi et al. | |
| 2009/0291371 A1 | 11/2009 | Konishiike et al. | |
| 2009/0305131 A1 | 12/2009 | Kumar et al. | |
| 2009/0305135 A1 | 12/2009 | Shi et al. | |
| 2009/0316335 A1 | 12/2009 | Simon et al. | |
| 2010/0043877 A1 | 2/2010 | Wang et al. | |
| 2010/0047695 A1 | 2/2010 | Smart et al. | |
| 2010/0119956 A1 | 5/2010 | Tokuda et al. | |
| 2010/0122725 A1 | 5/2010 | Buchine et al. | |
| 2010/0136393 A1 | 6/2010 | Takezawa et al. | |
| 2010/0159337 A1 | 6/2010 | Matsumoto et al. | |
| 2010/0209775 A1 | 8/2010 | Kim et al. | |
| 2010/0266897 A1 | 10/2010 | Lee et al. | |
| 2010/0273048 A1 | 10/2010 | Machida et al. | |
| 2010/0285358 A1 | 11/2010 | Cui et al. | |
| 2010/0310941 A1 | 12/2010 | Kumta et al. | |
| 2010/0330421 A1 | 12/2010 | Cui et al. | |
| 2010/0330423 A1 | 12/2010 | Cui et al. | |
| 2011/0045357 A1 | 2/2011 | Saito et al. | |
| 2011/0111294 A1 | 5/2011 | Lopez et al. | |
| 2011/0159367 A1 | 6/2011 | Kim et al. | |
| 2011/0205688 A1 | 8/2011 | Ray et al. | |
| 2012/0028123 A1 | 2/2012 | Asari et al. | |
| 2012/0183856 A1 | 7/2012 | Cui et al. | |
| 2012/0301785 A1 | 11/2012 | Buchine et al. | |
| 2013/0004657 A1 | 1/2013 | Xu et al. | |
| 2013/0320582 A1 | 12/2013 | Cui et al. | |

FOREIGN PATENT DOCUMENTS

| | | |
|---|---|---|
| EP | 1494302 | 1/2005 |
| EP | 2427928 | 3/2012 |
| FR | 2880198 | 6/2006 |
| GB | 2470056 | 11/2010 |
| JP | 09-245831 | 9/1997 |
| JP | 2003/045487 | 2/2003 |
| JP | 2007/012310 | 1/2007 |
| JP | 2007-061945 | 3/2007 |
| JP | 2007-123100 | 5/2007 |
| JP | 2008-026595 | 2/2008 |
| JP | 2008-192594 | 8/2008 |
| JP | 2008/269827 | 11/2008 |
| JP | 2008-305781 | 12/2008 |
| JP | 2009/009206 | 1/2009 |
| JP | 2009-021226 | 1/2009 |
| JP | 2010-525549 | 7/2010 |
| JP | 2010/538444 | 12/2010 |
| JP | 2012-526364 | 10/2012 |
| JP | 2012-527735 | 11/2012 |
| KR | 2009/0019339 | 2/2009 |
| WO | 2006/123049 | 11/2006 |
| WO | 2007/083152 | 1/2007 |
| WO | 2007/071778 | 6/2007 |
| WO | 2007/083155 | 2/2008 |
| WO | 2008/139157 | 11/2008 |
| WO | 2009/008558 | 1/2009 |
| WO | 2009/010757 | 1/2009 |
| WO | 2009/010758 | 1/2009 |
| WO | 2009/010759 | 1/2009 |
| WO | 2009/031715 | 3/2009 |
| WO | 2009/033015 | 3/2009 |
| WO | 2010/100599 | 9/2010 |
| WO | 2010/129910 | 11/2010 |
| WO | 2010/138617 | 12/2010 |
| WO | 2010/138619 | 12/2010 |
| WO | 2011/056847 | 5/2011 |
| WO | 2011/109477 | 9/2011 |

OTHER PUBLICATIONS

Aifantis et al., "High energy density lithium batteries," 2010 WILEY-VCH Verlag GmbH & Co. KGaA, Weinheim (Chapter 6: Next-generation anodes for secondary Li—Ion batteries).

Kasavajjula et al., "Nano- and bulk-silicon-based insertion anodes for lithium-ion secondary cells," Journal of Power Sources 163 (2007) 1003-1039.

Sasaki et al., "Direct fluorination of y-butyrolactone," J. Fluorine Chemistry 108 (2011) 117-120, Dec. 18, 2000.

Sasaki et al., "Physical and electrolytic properties of difluorinated dimethyl carbonate," Journal of Fluorine Chemistry 125 (2004) 1205-1209.

Sasaki et al., "Electrolytic behavior and application to lithium batteries of monofluorinated dimethyl carbonate," Solid State Ionics 177 (2006) 299-303, Oct. 21, 2005.

Nanbu et al., "Electrochemical properties of fluoropropylene carbonate and its application to lithium-ion batteries," Electrochemistry Communications 10 (2008) 783-786, Mar. 4, 2008.

Etacheri, Vinodkumar et al., "Exceptional electrochemical performance of Si-Nanowires in 1, 3-dioxolane solutions: a surface chemical investigation," Langmuir 2012, 28, 6175-6184, Mar. 19, 2012.

(56) References Cited

OTHER PUBLICATIONS

WO patent application No. PCT/US2011/060241, International Search Report and Written Opinion mailed Apr. 12, 2012.
US Appl. No. 13/480,354, "Electrolytes for rechargeable batteries," Roberts et al., filed May 24, 2012.
US Appl. No. 12/437,529, Office Action mailed Dec. 22, 2011.
Cui, Yi et al., "Doping and electrical transport in silicon nanowires", The Journal of Physical Chemistry, vol. 104, No. 22, Jun. 8, 2000.
WO patent application No. PCT/US2010/036235, International Search Report and Written Opinion mailed Jan. 28, 2011.
WO patent application No. PCT/WO2010/036237, International Search Report and Written Opinion mailed Feb. 1, 2011.
Frackowiak, E., et al., "Electrochemical Storage of Lithium Multiwalled Carbon Nanotubes," Carbon 37, 1999, pp. 61-69.
WO patent application No. PCT/US2010/034106, International Search Report and Written Opinion mailed Feb. 7, 2011.
US Appl. No. 12/437,529, Office Action mailed May 13, 2011.
US Appl. No. 12/437,529, Final Office Action mailed Oct. 20, 2011.
Office Action mailed Apr. 26, 2012, issued in U.S. Appl. No. 12/787,138.
Chan, et al., "High-Performance Lithium Battery Anodes Using Silicon Nanowires," Nature Nanotechnology, vol. 3, Jan. 2008, 5 pages.
Carbon Nanofiber Product Sheet—Applied Science, 2008, 1 page.
Cui, Li-Feng et al., "Crystalline-amorphous core-shell silicon nanowires for high capacity and high current battery electrodes," Nano Letters, 2009, vol. 9, No. 1 491-495, Dec. 23, 2008.
Kim, Cheol-Joo et al., "Spontaneous chemical vapor growth of NiSi nanowires and their metallic properties," Advanced Materials, 2007, 19, 3637-3642, Oct. 16, 2007.
Chan, Candace K. et al., "Surface chemistry and morphology of the solid electrolyte interphase on silicon nanowire lithium-ion battery anodes," Journal of Power Sources 189 (2009) 1132-1140.
Cui, Li-Feng et al., "Carbon-silicon core-shell nanowires as high capacity electrode for lithium ion batteries," Nano Letters, published on Aug. 5, 2009 on http://pubs.acs.org.
Esmanski, Alexei et al., "Silicon inverse-opal-based macroporous materials as negative electrodes for lithium ion batteries," Advanced Functional Materials, 2009, 1999-2010, May 7, 2009.
Park, Mi-Hee et al., "Silicon nanotube battery anodes," Nano Letters 2009, vol. 9, No. 11 3844 3847, Sep. 11, 2009.
Park, Mi-Hee et al., "Supporting information for silicon nanotube battery anodes," Nano Letters 2009, vol. 9, No. 11 3844-3847, Sep. 11, 2009.
Kim, Hyunjung et al., "Three-dimensional porous silicon particles for use in high-performance lithium secondary batteries," Angewandte Chemie, Int. Ed. 2008, 47, 10151-10154, Nov. 17, 2008.
For high-performance anode material in lithium-ion batteries, After Gutenberg, downloaded from http://jcwinnie.biz/wordpress/?p=2864 on Dec. 25, 2009.
Magasinki, A. et al., "High-performance lithium-ion anodes using a hierarchical bottom-up approach," Nature Materials, published online at www.nature.com/naturematerials Mar. 14, 2010.
Kang, Kibum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., Unconventional roles of metal catalysts in chemical-vapor syntheses of single-crystalline nanowires,: Journal of Applied Physics 105, 122407 (2009).
Zhang, Hong-Li et al., "The facile synthesis of nickel silicide nanobelts and nanosheets and their application in electrochemical energy storage," Nanotechnology 19 (2008) 165606, (7 pp), Mar. 20, 2008.
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Yazawa et al., "Effect of one monolayer of surface gold atoms on the epitaxial growth of InAs nanowhiskers," Appl. Phys. Lett. 61 (17), 2051-2053 (Oct. 1992).
EP patent application No. 08831531.2, European Search Report mailed Oct. 27, 2010.
Li et al., "Freestanding mesoporous quasi-single-crystalline Co3O4 nanowire arrays," J. Am. Chem. Soc. 2006, 128, 14258-14259, Oct. 18, 2006.
Sharma et al., "Diameter control of Ti-catalyzed silicon nanowires," Journal of Crystal Growth 267 (2004) 613-618, Apr. 20, 2004.
Pan et al., Nanobelts of Semiconduction Oxides, Science Mar. 9, 2001: 1947-1949.
Huang et al., Catalytic Growth of Zinc Oxide Nanowires by Vapor Transport, Adv. Mater., 13, 113-116 (2001).
Morales, et al., A Laser Ablation Method for the Synthesis of Crystalline Semiconductor Nanowires, Science vol. 279, Jan. 9, 1998.
Dick, et al A New Understanding of Au-Assisted Growth of III-V Semiconductor Nanowires, Adv. Funct. Mater. 15, 1603-1610 (2005).
Chan, C.K., et al., "High Capacity Li Lon Battery Anodes Using Ge Nanowires", Nano Letters, 2008, vol. 8, No. 1, 307-309.
Che, G., et al., "Carbon Nanotubule Membranes for Electrochemical Energy Storage and Production". Nature 393, 346-349 (1998).
Huggins, R.A. & Nix, W.D. Decrepitation Model for Capacity Loss During Cycling of Alloys in Rechargeable Electrochemical Systems, Ionics 6, 57-63 (2000).
Lee, Y.M., et al. SEI layer formation on amorphous Si thin electrode during precycling. J. Electrochem. Soc. 154, A515-A519 (2007).
Green, M., et al Structured silicon anodes for lithium battery applications. Electrochem. Solid State Lett. 6, A75-A79 (2003).
Ryu, J.H., et al Failure modes of silicon powder negative electrode in lithium secondary batteries. Electrochem. Solid-State Lett. 7, A306-A309 (2004).
Gao, et al., "Alloy formation in nanostructured silicon." Adv. Mater. 13, 816-819 (2001).
Wang, Y., et al. Epitaxial growth of silicon nanowires using an aluminum catalyst. Nature Naotech. 1, 186-189 (2006).
Wu, Y. et al. Controlled growth and structures of molecular-scale silicon nanowires. Nao Lett. 4, 433-436 (2004).
Zhou, Controlled Li Doping of Si Nanowires (Applied Physics Letters vol. 75, num. 16), Oct. 18, 1999.
U.S. Appl. No. 13/427,681, Office Action mailed Oct. 25, 2012.
Marczak et al., "The individual core/shell silicon nanowire structure probed by Raman spectroscopy", Phys. Status Solidi C 6, No. 9, 2053-2055 (2009).
Campbell et al., "Preparation of mesoporous silica templated metal nanowire films on foamed nickel substrates", Microporous and Mesoporous Materials 97 (2006) 114-121.
Final Office Action mailed Oct. 11, 2012, issued in U.S. Appl. No. 12/787,138.
S.K. Samudrala and S. Bandyopadhyay: Hybrid Nanocomposite for Nanotechnology, 2009, p. 245.
U.S. Appl. No. 12/787,138, Notice of Allowance mailed Jan. 28, 2013.
U.S. Appl. No. 12/787,168, Office Action mailed Jan. 10, 2013.

(56) References Cited

OTHER PUBLICATIONS

U.S. Appl. No. 13/891,035, "Interconnected hollow nanostructures containing high capacity active materials for use in rechargeable batteries," Cui et al., filed May 10, 2013.
U.S. Appl. No. 13/427,681, Office Action mailed Jun. 11, 2013.
EP patent application No. 10781151.5, Supplemental European Search Report mailed Jun. 28, 2013.
EP patent application No. 10781153.1, Supplemental European Search Report mailed Jul. 4, 2013.
Cheng Mu et al., "Silicon nanotube array/gold electrode for direct electrochemistry of cytochrome e," J. Phys. Chem. B 2007, 111, 1491-1495, Nov. 21, 2006.
U.S. Appl. No. 12/787,168, Office Action mailed Sep. 10, 2013.
U.S. Appl. No. 13/427,681, Office Action mailed Oct. 2, 2013.
Chan, Candace K. et al., "Structural and electrochemical study of the reaction of lithium with silicon nanowires," Journal of Power Sources 189 (2009) 34-39.
JP patent application No. 2012-513225, Notification of Reasons for Rejection mailed Dec. 17, 2013.
CN patent application No. 201080023345.9, Office Action mailed Dec. 27, 2013.
U.S. Appl. No. 12/787,168, Office Action mailed Feb. 26, 2014.
JP patent application No. 2012-510025, Notice of Reasons for Rejection mailed Jan. 7, 2014.
JP patent application No. 2012-513226, Japanese Office Action mailed Feb. 4, 2014.
CN patent application No. 201080023257.9, Chinese Office Action mailed Dec. 12, 2013.
Emmenegger, et al., "Carbon Nanotubes Synthesized on Metallic Substrates," Applied Surface Science, Aug. 1, 2000, pp. 452-456.
U.S. Appl. No. 13/427,681, Office Action mailed May 21, 2014.
U.S. Appl. No. 13/891,035, Office Action mailed Jun. 19, 2014.
CN patent application No. 201080026302.6, Office Action dated Aug. 8, 2014.
JP patent application No. 2012-510025, Decision of Rejection dated Aug. 5, 2014.
Park, M.S. et al., "Preparation and Electrochemical Properties of Sn02 Nanowires for Application in Lithium-ion Batteries" Angew. Chem. Int. Edn 46, 750-753 (2007).
U.S. Appl. No. 12/787,168, Final Office Action mailed Nov. 6, 2014.
CN patent application No. 201080023257.9, Chinese Office Action mailed Oct. 21, 2014.
CN patent application No. 201080023345.9, Office Action mailed Sep. 11, 2014.
CN patent application No. 201080026302.6, Office Action mailed Oct. 23, 2013.
U.S. Appl. No. 13/427,681, Final Office Action mailed Feb. 6, 2015.
JP patent application No. 2012-513226, Japanese Office Action mailed Feb. 10, 2015.
JP patent application No. 2012-513225, Decision for Grant and Allowed Claims.
Kasavajjula, et al., "Nano- and bulk-silicon-based insertion anodes for lithium-ion secondary cells," J. Power Sources 163, 1003-1339, 2007.

* cited by examiner

ELECTROLYTES FOR RECHARGEABLE BATTERIES

CROSS-REFERENCE TO RELATED APPLICATIONS

This application claims the benefit under 35 U.S.C. §119 (e) of U.S. Provisional Patent Application No. 61/413,888, entitled "ELECTROLYTES FOR RECHARGEABLE BATTERIES," filed on Nov. 15, 2010, which is incorporated herein by reference in its entirety for all purposes.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

BACKGROUND

The energy density of lithium ion batteries can be substantially improved by carbon-based electrode materials with high capacity active materials, such as silicon. Yet, high capacity materials present a new set of challenges not previously encountered with carbon-based materials. For example, the cycle life of cells built with high capacity active materials and conventional electrolytes tends to be much shorter than the cycle life of cells built with carbon based active materials and the same electrolytes. The selection of electrolytes may impact formation of solid electrolyte interphase (SEI) layers, ionic mobility, and various other factors that collectively impact the cycle life of a cell. Specific electrolyte formulation may be necessary to address these new challenges presented by introducing high capacity active materials into lithium ion batteries.

SUMMARY

Provided are novel electrolytes for use in rechargeable lithium ion cells containing high capacity active materials, such as silicon, germanium, tin, and/or aluminum. These novel electrolytes include one or more pyrocarbonates and, in certain embodiments, one or more fluorinated carbonates. For example, dimethyl pyrocarbonate (DMPC) may be combine with mono-fluoroethylene carbonate (FEC). Alternatively, DMPC or other pyrocarbonates may be used without any fluorinated carbonates. A weight ratio of pyrocarbonates may be between about 0% and 50%, for example, about 10%. Pyrocarbonates may be combined with other solvents, such as ethylene carbonate (EC), propylene carbonate (PC), dimethyl carbonate (DMC), diethyl carbonate (DEC), and/or ethylmethyl carbonate (EMC). Alternatively, pyrocarbonates may be used without such solvents. Experimental results conducted using electrochemical cells with silicon based electrodes demonstrated substantial improvements in cycle life when pyrocarbonate containing electrolytes were used in comparison with pyrocarbonate free electrolytes.

In certain embodiments, a lithium ion battery includes an electrode having an electrochemically active material, such as a silicon containing material, a tin containing material, a germanium containing material, and an aluminum containing material. The battery also includes an electrolyte comprising a lithium containing salt and a pyrocarbonate, such as dimethyl pyrocarbonate, diethyl pyrocarbonate, dipropyl pyrocarbonate, dibutyl pyrocarbonate, and ethylmethyl pyrocarbonate. In specific embodiments, the electrochemically active material includes elemental silicon or a silicon alloy. The electrode may include nanostructures, such as nanowires, with the electrochemically active material provided in these nanostructures. In certain embodiments, an outer surface of the nanowires includes elemental silicon, silicon oxide, silicon alloy, or silicide.

In specific embodiments, the battery includes silicon as its electrochemically active material. This battery may exhibit an average Coulombic efficiency of at least 99.8% after about 100 cycles during a cycling test. The cycling test may include charging the lithium ion battery to at least about 1050 mAh/g at rate of at least about C/2 and discharging to 900 mV versus lithium metal at a rate of at least about C/2 in each cycle. In certain embodiments, the electrolyte includes one or more pyrocarbonates that have a total concentration in the electrolyte of less than about 50% by weight, such as between about 1% and 10% by weight. In the same or other embodiments, the electrolyte includes one or more fluorinated carbonate solvents, such as mono-fluoroethylene carbonate, fluoropropylene carbonate, difluoroethylene carbonate, and fluoromethylethylene carbonate. A total concentration of the fluorinated carbonate solvents in the electrolyte may be less than about 50% by weight, for example, less than about 10% by weight.

Provided is also a lithium ion battery electrolyte for use in a lithium ion battery containing high capacity active materials. The electrolyte may include a lithium containing salt, a solvent, DMPC, and one or more fluorinated carbonate solvents. The DPMC may be present in the lithium ion battery electrolyte at a concentration of less than about 50% by weight (for example, between about 1% and 10% by weight). Examples of fluorinated carbonate solvents include mono-fluoroethylene carbonate, fluoropropylene carbonate, difluoroethylene carbonate, and fluoromethylethylene carbonate. The one or more fluorinated carbonate solvents may be present in the lithium ion battery electrolyte at a concentration of between less than about 50% by weight, for examples, between about 1% and 10% by weight. Examples of the solvent used in this electrolyte include EC, DMC, DEC, and/ or EMC. Examples of the lithium containing salt used in this electrolyte include lithium hexafluorophosphate (LiPF6), lithium hexafluoroarsenate monohydrate (LiAsF6), lithium perchlorate (LiClO4), lithium tetrafluoroborate (LiBF4), lithium bis(oxalato)borate (LiBOB), lithium oxalyldifluoroborate (LiODFB), LiPF3(CF2CF3)3 (LiFAP), and LiBF3 (CF2CF3)3 (LiFAB).

For purposes of this document, all concentration values of electrolyte components (with the exception of lithium containing salts, which are presented as molar ratios) are presented as weight percentages unless otherwise noted. The term "concentration" is generally used interchangeably with the term "weight ratio."

These and other embodiments are described further below with reference to the figures.

DETAILED DESCRIPTION OF EXAMPLE EMBODIMENTS

Figure 1:
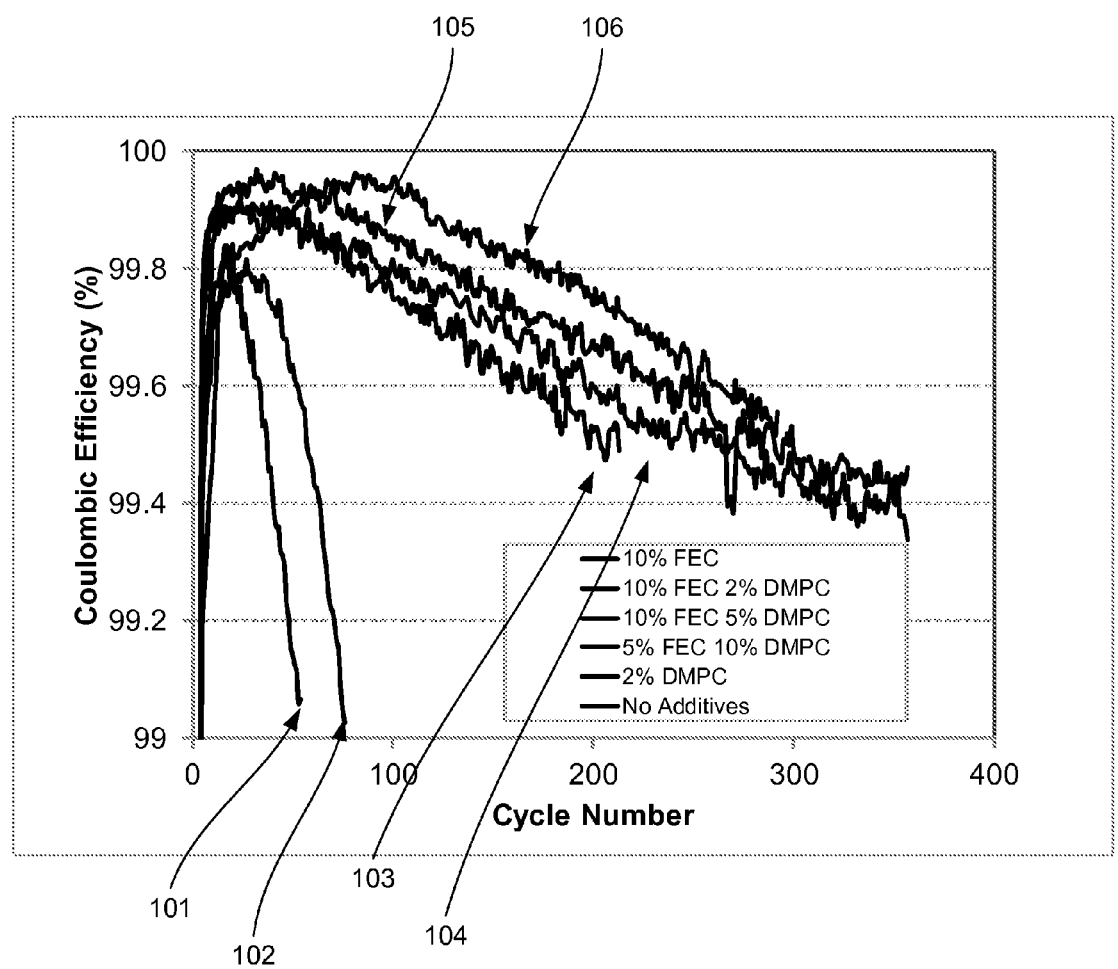
FIG. 1 illustrates Coulombic efficiency data for the silicon based test cells containing different electrolyte formulations.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

The adoption of high capacity active materials for rechargeable battery applications has been relatively slow. One major obstacle is the poor cycle life of the electrochemical cells built with such materials. While the initial capacities of these cells are generally much higher than the initial capacity of cells built with carbon-based materials, these higher initial capacities rapidly decline after only a few cycles. Often, these capacities fade below a usable level after only tens of cycles. Clearly, such cells are not usable for commercial applications. While some improvement has been achieved by specifically arranging high capacity negative active materials into particular structures, often this level of improvement is not sufficient to provide commercially feasible cell design by itself.

Without being restricted to any particular theory, it is believed that the poor cycle life of high capacity active materials may be attributable to at least two main causes. One of these causes is poor mechanical stability of high capacity active material structures during cycling, which causes pulverization of these structures. Many high capacity active materials tend to exhibit substantial swelling during lithiation and contraction during delithiation. For example, silicon structures can swell about 400% when lithiated to the theoretical capacity of silicon. Pulverization of the active material structures results in losses of mechanical and electrical connections within the electrode, which contribute to capacity fading.

Another perceived cause of capacity fading in cells containing high capacity active materials is an unstable SEI layer that typically forms on the exposed surfaces of active material structures. Specifically, electrolyte components, such as solvents, tend to decompose (or reduce) on the surface of these structures when subjected to a high voltage potential. The decomposition products are deposited on the surface, forming an SEI layer. The SEI layer contributes to and increases the electronic resistance of the electrode as the SEI layer thickens during additional formation. This, in turn, reduces the voltage potential on the exposed electrode surface and eventually stops further decomposition (reduction) and SEI layer formation. The SEI layer plays an important role in cell performance. As such, SEI layer formation is usually performed during fabrication of the cell using tightly controlled process parameters, such as charge and discharge rates, depths of charge and discharge, and other parameters.

When high capacity active materials are used, repeated swelling and contraction of the high capacity active material structures are believed to damage the SEI layer formed on the surface of the active material exposed to the electrolyte. The damaged SEI layer may expose some high capacity active material maintained at a high potential to the electrolyte, thereby causing additional decomposition of electrolyte at this interface and the formation of a new SEI layer or patch. The process of breaking and repairing the SEI layer may continue long after the initial formation performed during cell fabrication. A newly formed SEI layer or patches may be formed at less desirable and controlled operating conditions. Further, repeating this breaking and repairing process may irreversibly trap lithium in the SEI layer, reduce concentration of certain solvents in the electrolyte, and unnecessarily thicken the overall SEI layer resulting in a higher overall resistance. These phenomena may negatively impact cell performance and reduce the cell's cycle life.

Cycle life of a cell may be characterized by Coulombic efficiencies of individual lithiation and delithiation cycles. For purposes of this document, a Coulombic efficiency is defined as a ratio of the discharge capacity to the charge capacity in the same cycle. In a negative electrode example, a Coulombic efficiency is a ratio of a charge passed during lithium removal from the active material structures to a charge required to insert lithium into these active material structures. For practical battery applications, a Coulombic efficiency should approach the 100% level, such as at least about 99.5%, at least about 99.8%, or even greater, and stay at that level during most of the operating life time of the cell. Any deviation from the 100% level may aggregate over a large number of cycles and result in substantial capacity fading.

Carbon based electrodes form a stable SEI layer relatively quickly. Usually, only one or a few initial formation cycles are needed for SEI formation. This initially formed SEI layer remains generally unchanged during later operating cycles. Various cyclic carbonates, such as EC and PC, and linear carbonates, such as DMC, DEC, and EMC, have been successfully used in combination with carbon based electrodes.

Unlike carbon based active materials, high capacity active materials exhibit substantially different behavior when combined with conventional electrolytes containing the cyclic and/or linear carbonates listed above when no other solvents or additives are present. As explained above, it is believed that SEI layers formed over high capacity active material structures tend to be much more unstable than SEI layers formed over carbon based structures. High capacity active material structures swell and contract and apply substantial stresses on relatively hard and inflexible layers formed by these cyclic and/or linear carbonates. The SEI layers break and self-repair causing all kinds of performance problems, including cycle life fading, that are generally not present in cells built with carbon based active materials.

While pulverization of high capacity active material structures may have been addressed, at least in part, by arranging these materials into nanostructures, such as nanofilms, nanowires, and nanoparticles, even these smaller structures are believed to generate substantial stresses during their swelling and contraction. These stresses can damage SEI layers formed using conventional electrolyte formulations. In fact, these smaller structures may even amplify some SEI related issues. Specifically, smaller structures tend to have much larger exposed surface areas and have sharper angles between these structures than their bulkier counterparts. These characteristics of smaller structures may lead to even larger and less stable SEI layer.

It has been found that certain new electrolyte formulations substantially improve the cycle life performance of rechargeable electrochemical cells containing high capacity active materials. For example, one or more pyrocarbonates may be included in an electrolyte. Test results have clearly demonstrated that the addition of DMPC to a combination of EC and DMC substantially improves a cell's cycle life. The cycle life was characterized by coulombic efficiencies of multiple initial cycles. Some improvements have been achieved by adding FEC to a combination of EC and DMC. The best performance has been achieved when both DMPC and FEC have been combined with EC and DMC. These test results are described below in more detail.

Pyrocarbonates are believed to improve the stability and performance of an SEI layer and may reduce capacity fading. Lower lithium dendrite formation and improved rate performance have been attributed to the presence of pyrocarbonates in electrolytes. Furthermore, electrolytes containing pyrocarbonates tend to produce carbon dioxide, particularly when pyrocarbonates are present in large concentrations. The release of carbon dioxide that may be particularly significant during overcharge may be used to trip safety devices, such as current-interrupting circuit breakers. Furthermore, released carbon dioxide may act as flame retardant, thereby contributing to overall cell safety during runaway situations.

In certain embodiments, one or more pyrocarbonates are combined with one or more cyclic and/or linear carbonates in the same electrolyte. In other embodiments, one or more pyrocarbonates may completely replace linear carbonates. That is, such electrolyte formulations are substantially free from linear carbonates.

Various alkyl pyrocarbonates may be employed in electrolytes. Generally, the pyrocarbonate functional group has the following formula, where R1 and R2 may be the same or different moieties, typically each having one to six carbon atoms.

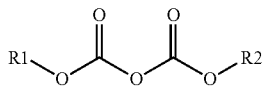

R1 and R2 may have some degree of unsaturation (e.g., one or more double or triple bonds). Further, R1 and R2 may have one or more substituents, such as halogen containing moieties or, more specifically, fluorine containing moieties, nitrogen containing moieties (e.g., amines and amides) and/or oxygen containing moieties (e.g., hydroxyl, ketones, aldehydes, and ethers). Still further, R1 and R2 together may form a ring structure with or without any substituents.

In the same or other embodiments, one or more pyrocarbonates are used in a combination with one or more fluorinated carbonates, such as fluoroalkyl carbonates. In some specific embodiments, DPMC is used with FEC or some other one or more fluorinated carbonates. Other electrolyte components in these embodiments may include EC, DMC, DMC, and/or EMC. In certain embodiments, a combination of one or more pyrocarbonates and one or more fluorinated carbonates may completely replace cycling and/or linear carbonates. That is, such electrolyte formulations are substantially free from cycling and/or linear carbonates. In certain embodiments, fluorinated pyrocarbonates are used. For example, a fluorinated version of dimethyl pyrocarbonate may be used, where trifluoromethyl (CF3) or other similar groups represent R1 and R2 in the structure presented above.

A weight ratio of one or more pyrocarbonates in the electrolyte formulation may be up to about 50% or, more specifically, up to about 20% or, even more specifically, between about 1% and 10% such as between about 2% and 5%. Similar weight ratios are applicable to fluorinated carbonates, such as FEC. In a particular embodiment, about 5 weight % of FEC and about 10 weight % of DPMC are used in a combination with EC and DMC, whereas EC and DMC may be present at equal weight ratios. In another embodiment, about 10 weight % of FEC and about 2 weight % of DPMC are used in a combination of EC and DMC that may be present at equal weight ratios. In yet another embodiment, about 10 weight % of FEC and about 5 weight % of DPMC are used with EC and DMC that may be present at equal weight ratios.

Specific electrolyte formulations will now be discussed in more detail. In certain embodiments, an electrolyte includes DMPC present at the following weight ratios: between about 0% and 50% or, more particularly, between about 1% and 20% or, even more particularly, between about 5% and 10% or between about 1% and 10%. Other pyrocarbonates may be used in addition to or instead of DMPC and be present at the same weight ratios. Some examples include diethyl pyrocarbonate, dipropyl pyrocarbonate, dibutyl pyrocarbonate, and ethylmethyl pyrocarbonate.

As mentioned above, the electrolyte may also include FEC. FEC may be used in a combination with DPMC and/or one or more other pyrocarbonates or without any pyrocarbonates. The weight ratio of FEC in the electrolyte may be between about 0% and 50% or, more particularly, between about 1% and 20% or, even more particularly, between about 5% and 10% or between about 1% and 10%. Other fluorinated carbonates may be used in addition to or instead of FEC. Some examples include fluoropropylene carbonate, difluoroethylene carbonate, and fluoromethylethylene carbonate. Other fluorinated species, such as fluorinated cyclic carboxylates and fluorinated cyclic ethers, may be used in various combinations with or instead of fluoropropylene carbonates.

In specific embodiments, FEC and DPMC may be used together in the following combinations: between about 2 weight % and 10 weight % of FEC and between about 5 weight % and 15 weight % of DPMC, or more specifically between about 3 weight % and 8 weight % of FEC and between about 8 weight % and 12 weight % of DPMC, or even more specifically about 5 weight % of FEC and about 10 weight % of DPMC. In other embodiments, weight ratios of FEC and DPMC are between about 5% and 15% for FEC and between about 0.5% and 5% for DPMC, or more specifically between about 8% and 12% for FEC and between about 1% and 4% for DPMC, or even more specifically about 10% for FEC and about 2% for DPMC. In yet another embodiment, weight ratios of FEC and DPMC are between about 5% and 15% for FEC and between about 1% and 10% for DPMC, or more specifically between about 8% and 12% for FEC and between about 3% and 8% for DPMC, or even more specifically about 10% for FEC and about 5% for DPMC. The combinations of FEC and DPMC listed above may be used together with EC and DMC that are present in the electrolyte solution at equal weight ratios. In other embodiments, FEC and DPMC are used without other solvents and may be present at weight ratios of between about 10% and 90% each or, more specifically, at weight ratios of between about 20% and 80% each.

In certain embodiments, an electrolyte includes DMPC or a combination of FEC and DPMC. Such electrolyte formulations may also include one or more additional solvents. Some examples of such additional solvents include various cyclic carbonates, such as EC and PC, and linear carbonates, such as DMC, DEC, and EMC. Other examples include butylene carbonate (BC), vinylethylene carbonate (VEC), gamma-butyrolactone (GBL), gamma-valerolactone (GVL) alpha-angelica lactone (AGL), methyl propyl carbonate (MPC), dipropyl carbonate (DPC), methyl butyl carbonate (NBC) and dibutyl carbonate (DBC), tetrahydrofuran (THF), 2-methyltetrahydrofuran, 1,4-dioxane, 1,2-dimethoxyethane (DME), 1,2-diethoxyethane, 1,2-dibutoxyethane, acetonitrile, adiponitrile, methyl propionate, methyl pivalate, butyl pivalate and octyl pivalate, amides, dimethyl formamide, trimethyl phosphate, and trioctyl phosphate.

An electrolyte may include one or more salts selected from the following list: $LiPF_6$, $LiAsF_6$, $LiClO_4$, $LiBF_4$, $LiBC_4O_8$ (LiBOB), $LiBC_2O_4F_2$ (LiODFB), $LiPF_3(C_2F_5)_3$ (LiFAP), $LiBF_3(C_2F_5)$ $LiPF_3(C_2F_5)_3$ (LiFAB), $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(CF_3)_3$, $LiPF_3(iso-C_3F_7)_3$, $LiPF_5(iso-C_3F_7)$. The overall salt concentration may be between about 0.3M and 2.5M or, more specifically, between about 0.7M and 1.5M, for example about 1.0M.

The electrolyte formulations described above may be used in cells fabricated with various high capacity active materials. Some examples of these materials include various silicon containing materials (e.g., crystalline silicon, amorphous silicon, other silicides, silicon oxides, sub-oxides, oxy-nitrides). Other examples include tin-containing materials (e.g., tin, tin oxide), germanium, carbon-containing materials, a variety of metal hydrides (e.g., $MgH_2$), silicides, phosphides, and nitrides. Additional examples include carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). More generally, a high capacity active material may include silicon, tin, germanium, and aluminum as well as their alloys and other compounds. High capacity active materials are defined herein as active materials with theoretical lithiation capacities of at least about 700 mAh/g.

The high capacity active material may be in various forms, such as a uniform thin layer, particles bound to the substrate with the polymeric binder, substrate rooted nanostructures, and other forms and structures. In certain embodiments, high capacity active materials are formed as substrate rooted nanostructures. These nanostructures may be physically and conductively attached to a conductive substrate, which may serve as a current collector for this electrode. The physical attachment may be more than a simple mechanical contact, which might result, for example, from coating a binder with discrete nanostructures onto the substrate. In some embodiments, the physical attachment results from fusion of the nanostructures to the substrate or deposition of the nanostructures or some portion of the nanostructures directly onto the substrate, for example, using chemical vapor deposition (CVD) techniques or, even more, specifically using vapor-liquid-solid CVD growth. In yet another example, physical attachment results from ballistic impalement of the nanostructures onto the substrate. In certain embodiments, physical attachment includes certain forms of metallurgical bonds, such as a formation of alloys of two bonded materials (e.g., silicides).

Nanostructures may be rooted to the substrate at random locations on the structure's profiles (randomly rooted), or rooted preferentially at some particular location on the nanostructures (non-randomly rooted). Examples of non-randomly rooted nanostructures include terminally rooted nanostructures (e.g., nanowires and nanorods) and medially rooted nanostructures preferentially affixed to the substrate at medial positions (rather than a terminal position). In particular examples, nanostructures are nanowires with an aspect ratio of at least about 4, or, more specifically, at least about 10. Nanowires may be between about 10 nanometers and 1000 nanometers in diameter and between about 1 micrometer and 100 micrometers in length.

In specific embodiments, an electrolyte containing DMPC and FEC is used in a rechargeable cell having a silicon-based electrode, or more specifically, substrate-rooted silicon nanowires. The electrolyte may be about 5% by weight of FEC and about 10% by weight of DPMC added to EC and DMC present at equal weight ratios. In other embodiments, a weight ratio of FEC may be about 10%, while a weight ratio of DPMC may be 2%. In yet other embodiments, DPMC may be presented at a weight ratio of 5%, and FEC may be present at a weight ratio of about 10% FEC. In certain embodiments, a lithium ion battery assembled with such electrolytes exhibits an average Coulombic efficiency of at least 99.8% after 100 cycles during a cycling test. The Coulombic efficiency value may be averaged over a predetermined number of cycles (e.g., five cycles or ten cycles) to avoid the influence of noise and other unexpected variations. The cycling test may involve charging the lithium ion battery to 1050 mAh/g at C/2 and discharging to 900 mV at C/2 rate in each cycle.

Various electrolyte formulations were tested using coin type (2032 size) half-cells with silicon containing test electrodes and lithium metal counter electrodes. The working electrodes were constructed by depositing a layer of silicon over a template structure containing nickel. These electrodes were combined with a 0.75 millimeter thick lithium foil and 25 micrometer thick separator. The test cells were filled with different electrolyte formulations. All formulations included 1M $LiPF_6$ and equal weight ratios of EC and DMC. Some formulations also included pyrocarbonates and/or fluorinated carbonates. One formulation that did not include any pyrocarbonates or fluorinated carbonates was used as a base. The cells were subjected to one formation cycle that included charging to 1400 mAh/g at the rate of C/20 followed by discharging to 900 mV at the same rate, which was not a part of the test data. The cells were then tested using multiple operating cycles. In each operating cycle, the cells were charged to 1050 mAh/g at the rate of C/2 and discharged to 900 mV at the same rate.

FIG. 1 illustrates Coulombic efficiency data for the first 350 operating cycles. All lines were constructed using a 5-point smoothing technique to eliminate variations of individual cycles and to better reflect the overall coulombic efficiency trends. The lines represent Coulombic efficiencies of six cells tested with different concentrations of DPMC and FEC added to the base electrolyte.

Line 101 corresponds to a cell built with a base electrolyte that did not have any DPMC or FEC additives. This electrolyte formulation has been successfully used in graphite-based cells showing Coulombic efficiencies of about 100%. However, when this electrolyte formulation were tested with cells containing silicon based electrodes, the silicon based cells performed much worse in terms of Coulombic efficiencies than the graphite-based cells. Specifically, the Coulombic efficiency of the tested silicon based cells started to decrease rapidly after only 20 cycles and fell below 99.5% within 40 cycles.

Line 102 corresponds to a cell with 2 weight % of DMPC added to the base electrolyte. No FEC additives were used in this formulation. The Coulombic efficiency improved compared to the additive-free formulation represented by line 101, but it still dropped rapidly and fell below 99.5% within 60 cycles.

Line 103 corresponds to a cell built with 10 weight % of FEC added to the base electrolyte. No DMPC additives were used in this formulation. The Coulombic efficiency of this cell was much better than that of the cell with the base electrolyte represented by line 101. For example, after 50 cycles, the Coulombic efficiency of this cell was still about 99.9%, while the Coulombic efficiency of the cell with the base electrolyte was already below 99%. The coulombic efficiency eventually fell below 99.5% before the $200^{th}$ cycle.

Lines 104, 105, and 106 correspond to cells built with modified electrolytes that contained both FEC and DMPC additives in differing concentrations. Line 104 corresponds to a cell built with an electrolyte containing 10 weight % of FEC and 2 weight % of DMPC. Line 105 corresponds to a cell built with an electrolyte containing 10 weight % of FEC and 5 weight % of DMPC, while line 106 corresponds to a cell built with an electrolyte containing 5 weight % of FEC and 10 weight % of DMPC. Using these combinations of DMPC and FEC improved the Coulombic efficiency even more. Specifically, the Coulombic efficiency did not drop below the 99.5% level until after more than 200 cycles, which is more than a ten-fold improvement over the base electrolyte.

When comparing lines 103 with lines 104 and 105, all of which correspond to electrolytes with 10 weight % of FEC, it can be seen that the addition of DMPC to an electrolyte containing FEC helps to further improve the Coulombic efficiency. Among the three electrolytes containing both FEC and DMPC, the electrolyte with the highest DMPC content and lowest FEC content (corresponding to line 106) showed a much slower initial rise in Coulombic efficiency during the first 50 cycles. This may indicate that higher concentrations of DMPC and lower concentrations of FEC, like the compositions represented by lines 104 and 105, may be more optimized for use with silicon based electrodes. Without being restricted to any particular theory, it is believed that the Coulombic efficiency increase and stability when FEC and DMPC are used together is due to a complex synergistic effect between certain ratios of FEC and DMPC that produce an SEI layer with unique characteristics. FEC is widely believed to increase the fluorine content in the SEI layer, and DMPC's effect may be due to increasing the lithium carbonate content in the SEI layer. Similar synergies have been previously shown with FEC and other types of additives and salts in carbon-based cells.

Various high capacity active materials may be used to form an electrode for use in a rechargeable cell. Some examples of these materials include various silicon containing materials, such as crystalline silicon, amorphous silicon, other silicides, silicon oxides, sub-oxides, and oxy-nitrides. Other examples include tin containing materials (such as tin and tin oxide), germanium containing materials, carbon containing materials, a variety of metal hydrides (such as magnesium hydride), silicides, phosphides, and nitrides. Still other examples include carbon-silicon combinations, such as carbon-coated silicon, silicon-coated carbon, carbon doped with silicon, silicon doped with carbon, and alloys including carbon and silicon. Similar combinations of carbon and germanium, as well as similar combinations of carbon and tin, may be used. Various aluminum containing materials may be used as well. Overall, a high capacity active material may be defined as an active material with a theoretical lithiation capacity of at least about 700 mAh/g. The theoretical capacity of the active material should be distinguished from a deigned operating capacity of the electrode and/or cell. Generally, an operating capacity is a fraction of the theoretical capacity. For example, during operation of the cell, active material may not be fully charged, discharged, or both. In a specific example, an electrode containing silicon may be cycled between the operating discharge level (e.g., corresponding to the silicon lithiation state of between about 500 mAh/g and 1500 mAh/g) and the operating charged level (e.g., corresponding to the silicon lithiation state of between about 1500 mAh/g and 3000 mAh/g). For reference, the theoretical capacity of silicon is 4200 mAh/g.

Some high capacity active materials have poor electrical conductivity in comparison, for example, to graphite and other carbon based materials. Conductivity can be improved by introducing various conductive additives into structures containing high capacity active materials or providing conductive additive structures among the active material structures. For example, certain high capacity active materials may be doped during their deposition (e.g., formation of nanostructure containing these high capacity active materials) and/or during treatment of deposited materials. For the purposes of this document, any addition of conductivity enhancement components into active material structures is referred to as doping regardless of the concentration of these conductivity enhancement components or methods of introducing these components. In certain embodiments, elements from the groups III and V of the periodic table are used as conductivity enhancing components in silicon containing nanostructures. Specifically, silicon containing nanostructures may be doped with one or more elements from the group consisting of boron, aluminum, gallium, indium, thallium, phosphorous, arsenic, antimony, and bismuth. It has also been found that certain conductivity enhancement components improve charge transfer properties of the electrode. Other dopant atoms besides group III or V atoms may be employed, such as sulfur and selenium. Doped silicon has a higher electron or hole density in comparison with un-doped silicon (e.g., Fermi level shifts into the conduction or valence band, resulting in higher conductivity). In certain embodiments, silicon containing nanostructures are doped with lithium during fabrication of the electrode and prior to electrochemical cycling of the fabricated cell. Lithium doping helps to compensate for losses of lithium during SEI formation. More than one dopant material may be used in the same nanostructure. Depending on the concentration of materials introduced into silicon containing nanostructures, the resulting nanostructure may be transformed into a semiconductor (concentration is between about $10^{14}$ and $10^{19}$ atoms per centimeter cubed), a highly doped metalized conductive silicon (concentration is between about $10^{19}$ and $10^{21}$ atoms per centimeter cubed), or a silicon alloy (concentration is greater than about $10^{21}$ atoms per centimeter cubed). A higher concentration is usually desirable for higher conductivity.

Various methods may be used to introduce dopants into the nanostructures. For example, a gas phase doping involves introducing dopant-containing precursors together with base material precursors, such as silane for silicon nanostructures. Relative flow rates of precursors may vary during deposition to achieve dopant concentration gradients within the nanostructures. For example, a mixture of hydrogen, silane, and about 10 ppm of phosphine may be flowed into the deposition chamber. The silane gas decomposes at catalyst sites and forms silicon wires. The phosphine similarly decomposes and leaves phosphorus that incorporates into the silicon nanostructures as a dopant by replacing silicon in some lattice sites. Another method for doping involves spin-on coating. For example, an organic polymer containing dopants may be coated over a layer of deposited nanostructures. The coated nanostructures are then baked at between about 200° C. and 600° C. for between about 20 and 30 minutes. The organic polymer decomposes into gases that are removed from the baking chamber leaving dopant on the nanostructures. Some dopant may diffuse into the nanostructures. Another doping method includes evaporating a dopant during the nanostructure formation and trapping some of the evaporated dopant in the newly formed nanostructures. For example, aluminum and indium may dope silicon nanostructures using this method. A temperature range for evaporation may be between about 150° C. and 700° C., depending on the material to be evaporated.

Structures formed from active materials or, more specifically, from high capacity active materials, may have various shapes and dimensions depending on compositions, crystallographic structures (e.g., crystalline, amorphous), deposition process parameters, and many other factors. Shapes and sizes may also change during cycling. Sizes of active material structures may be characterized with a cross-sectional dimension. For the purposes of this document, a cross-section dimension is defined as a distance between the two most separated points on a periphery of a cross-section that is transverse to the principal dimension, such as length. For example, a cross-section dimension of a cylindrical nanowire is its diameter. A cross-section dimension of an irregular particle is the distance between its two most separated corners and/or surfaces. However, a cross-section dimension of a layer or a coating is an average thickness of this layer or coating.

High capacity active materials are generally formed into structures such that their cross-section dimensions are generally below the fracture limits of these high capacity active materials. In certain embodiments, a cross-section dimension is between about 1 nanometer and 10,000 nanometers. In more specific embodiments, a cross-section dimension is between about 5 nanometers and 1000 nanometers, and more specifically between 10 nanometers and 200 nanometers. These dimension ranges are generally applicable to silicon containing high capacity active materials, such as amorphous or crystalline silicon.

High capacity active materials may be formed into various types of nanostructures, which have cross-section dimensions less than 1,000 nanometers (i.e., at least one nanoscale dimension). Some examples of nanostructures include nanofilms that have a nanoscale dimension along one axis, nanowires that have nanoscale dimensions along two axes, and nanoparticles that have nanoscale dimensions along all three axes. For the purposes of this document, nanowires are defined as structures that have, on average, an aspect ratio of at least about four to distinguish them from nanoparticles. In certain examples, the average aspect ratio may be at least about ten, at least about one hundred, or even at least about one thousand. High capacity active materials formed into nanowire can undergo substantial swelling without disrupting the overall electrode structure. Nanowires also provide electrical and mechanical connections with the electrode, especially along their lengths, which may be extending substantially perpendicular to the conductive substrate and determine, at least in part, the thickness of the electrode.

Nanostructures containing high capacity active materials may be hollow. The cross-section profile of such hollow nanostructures includes void regions surrounded by annular solid regions. An average ratio of the void regions to the solid regions may be between about 0.01 and 100, more specifically between about 0.01 and 10. The cross-section profile of hollow nanostructures may be substantially constant along their principal dimensions, such as length of the nanotubes. Alternatively, the hollow nanostructures may be tapered along the principal dimension. Hollow nanostructures may have nanoscale wall thickness (e.g., less than 1,000 nanometers). In the same or other embodiments, the average cross-section dimension (e.g., the average diameter) of hollow nanotubes may be less than 1,000 nanometers. In other embodiments, hollow nanotubes may have a micrometer-scale cross-section dimension, while their wall thickness is at the nanoscale.

The longest dimension of nanostructure is referred to as a principal dimension. For example, the principal dimension of nanowires is their length, which on average may be at least about 1 micrometer or, more specifically, at least about 10 micrometers.

Figure 2A:
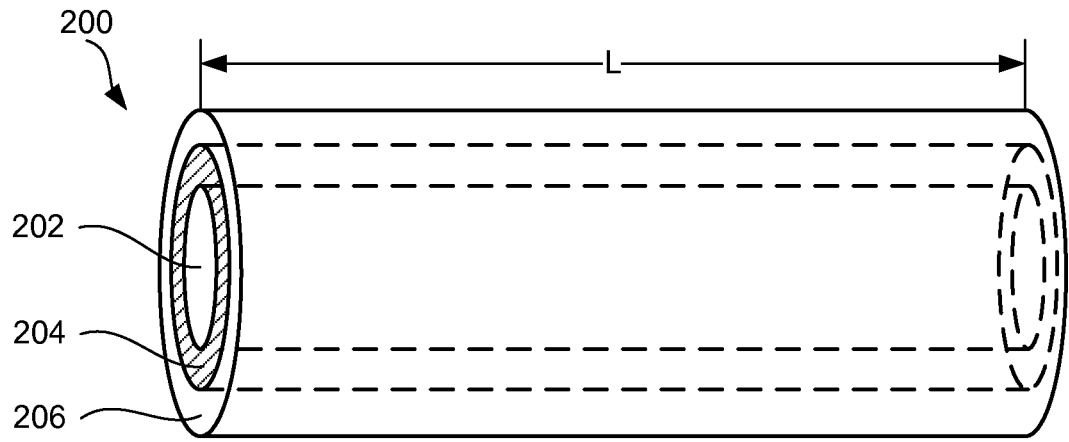
FIG. 2A is schematic perspective view of a core-shell nanostructure 200 that includes a core, inner shell, and outer shell, in accordance with certain embodiments.

High capacity active materials may form a part of core-shell nanostructures, for example, and may be included as a part of a core, one or more shells, or both. FIG. 2A is schematic perspective view of a core-shell nanostructure 200 that includes a core 202, inner shell 204, and outer shell 206, in accordance with certain embodiments. It should be understood that core-shell nanostructures may have any number of inner shells (i.e., one or more such as up to fifty or, more specifically, up to ten). A number, composition, and arrangement of such shells may be driven by various functionalities of the nanostructures, such as electrical connections, mechanical support, high capacity, cycle life, SEI layer formation, and many others. For clarity, FIG. 2A illustrates one inner shell, and the description below is directed to the one such shell. However, it should be understood that this description is applicable to other configurations as well.

Generally, though not necessarily, core 202 and shells 204 and 206 extend through the entire principal dimension, which is the longest dimension of the nanostructure 200 (e.g., its length (L)). For example, a core 202 and one or more shells 204 and 206 may share a substantially common axis along the principal dimension. In certain embodiments, one or more shells may be shorter than the principal dimension of nanostructure 200. For example, an outer shell may extend less than about 90%, less than about 75%, or less than about 50% of the principal dimension. Further, a shell may completely cover a core or a corresponding inner shell. Alternatively, an outer shell may partially cover an inner shell, leaving certain areas of the inner layer exposed.

Figure 2B:
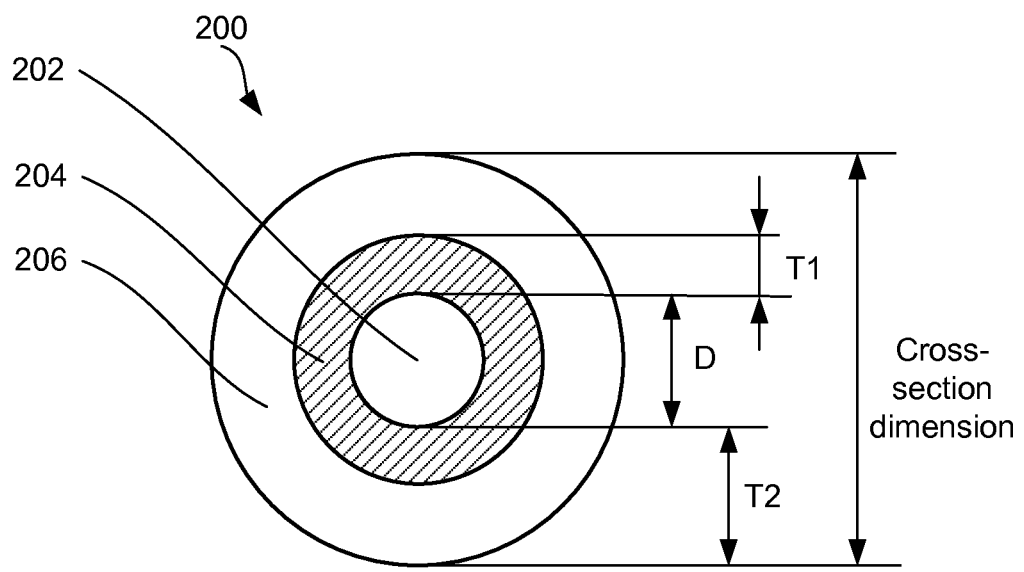
FIG. 2B is schematic cross-section view of nanostructure 200, in accordance with certain embodiments.

FIG. 2B is schematic cross-section view of nanostructure 200, in accordance with certain embodiments. Cross-sectional shapes of nanostructures and each individual component generally depend on compositions, crystallographic structures (e.g., crystalline, amorphous), sizes, deposition process parameters, and other factors. Shapes may also change during cycling.

Shells may be in a form of nested or concentric layers around a core, which may be in a form of a rod or wire. One shell (e.g., an inner shell) may be surrounded by another shell (e.g., an outer shell) forming, for example, a set of concentric structures (e.g., cylinders) similar to the structure shown in FIG. 2B. In other embodiments (not shown), each layer of the nanostructure is a sheet that is rolled around itself and other layers to form a spiral. For conciseness, both of these embodiments are referred to as a core-shell structure. Not all shell layers may be fully concentric to the core and/or other shell layers. For example, one or more shells may not cover the full angular extent of the core circumference or one of the inner shells. Such gaps may extend fully or partially along the length of the principal dimension.

Core-shell structures may have various shapes, such as nanorods/wire shapes, particle shapes (including spheres, ellipsoids, etc.), pyramids rooted to a substrate, spider structures having multiple rods and/or particles extending from a common connection point or region, and the like. Further, the rods or other structures may have a non-linear shape, which includes shapes where the axial position bends or even assumes a tortuous path.

Various components of core-shell structures may be characterized by their dimension in the cross-section plane as shown in FIG. 2B, such as various cross-sectional dimensions and shell thicknesses. In certain embodiments, an average cross-section dimension of the core (D) is between about 5 nanometers and 500 nanometers or, in more specific embodiments, between about 10 nanometers and 100 nanometers. This dimension will generally depend on the core materials (e.g., conductivity, compressibility), thickness of the inner layer containing silicon, and other parameters. For example, high rate battery applications may require a larger core to reduce an overall resistance of the nanostructures. Generally, a cross-section dimension of the core (and thicknesses of shells further described below) does not substantially vary along the length of the nanostructure. However, in certain embodiments, the core (and possibly a resulting nanostructure) may be tapered or have a have variable cross-section dimension along the length.

One or more inner shells may be characterized by their average thicknesses (T1). When a high capacity active material is used to form an inner shell, the thickness values may be selected such that the active material stays below its fracture stress level during cycling. Determining factors may include a crystallographic structure of the high capacity active material (e.g., crystalline or amorphous), an average cross-section dimension (D) of core 202, materials used for core 202 and outer shell 206, materials used for the inner shell 204, capacity and rate requirements, and other factors. The average thickness of the inner layer may be between about 5 nanometers and 500 nanometers or, more specifically, between about 10 nanometers and 100 nanometers.

Outer shell 206 may be designed to coat inner shell 204 and, for example, to protect inner shell 204 from contacting an electrolyte. In these examples, an SEI layer is formed on a surface of outer shell 206 and away from inner shell 204. Therefore, materials and other characteristics of outer shell 206 may be selected in such as a way that a more desirable SEI layer is formed, and this SEI layer remains during cycling of the cell. Other functions and characteristics of outer shell 206 may include high ionic conductivity and mechanical elasticity (e.g., to reduce stress between swelling and contacting inner shell 204 and the SEI layer formed on the other side of outer shell 206). Further, outer shell 206 may be used to provide electrical and/or mechanical contacts among nanostructures in the electrode, to establish mechanical and/or electrical contacts to the conductive substrate (if one is used), and/or other purposes. The thickness (T2) of outer shell 206 may be selected to provide one or more functions listed above, and may be between about 1 nanometer and 100 nanometers or, in more specific embodiments, between about 2 nanometers and 50 nanometers.

In the same or other embodiments, an average principal dimension (L) (e.g., the average length for rood-like structure) of the core is between about 1 micrometer and 100 centimeters or, more specifically, between about 1 micrometer and 10 millimeters or, even more specifically, between about 1 micrometer and 100 micrometers. For example, longer structures may be formed by electrospinning and positioned generally parallel to the conductive substrate. Shorter structures, such as shorter than 500 micrometers or, more specifically, shorter than 100 micrometers may be formed using growth rooted techniques right on the substrate and extend substantially perpendicular to the substrate. More specifically, cores may be formed using growth rooted methods and may include conductive template materials, such as nickel silicides, or even high capacity active materials. Other length ranges may include: between about 1 micrometer and 10 centimeters, between about 1 micrometer and 1 centimeter, or between about 1 micrometer and 100 millimeters. Generally, the length of the overall structure may be determined by the length of its core. However, in certain embodiments, the length of the overall structure may longer than the length of its core. In more specific embodiments, the core may be partially or completely removed, resulting in hollow structures as further described below. It should be noted that some dimensions described below would change during electrochemical cycling of the electrodes containing nanostructures. Unless otherwise noted, these values correspond to newly deposited nanostructures before the initial cycling.

In certain embodiments, the core 202 is solid. For example, a core may be a fiber (carbon, metal), a rod, a wire, or any other similar shape. In other embodiments, a core may be a hollow (e.g., tube-like) structure as. A hollow core may be formed from an initially solid core. For example, a solid core may be shrunk or partially removed to form a hollow core. In another embodiment, a hollow core may be formed by depositing core materials around a template that is later removed. In certain embodiments, a carbon single wall nanotube (SWNT) or multi-wall nanotube (MWNT) may serve as a core. The cross-sectional profile of these hollow nanostructures includes void regions surrounded by annular solid regions. An average ratio of the void regions to the solid regions may be between about 0.01 and 100, or more specifically, between about 0.01 and 10. The cross-section dimension of the hollow nanostructures may be substantially constant along the principal dimension (e.g., typically the axis). Alternatively, the hollow nanostructures may be tapered along the principal dimension. In certain embodiments, multiple hollow nanostructures may form a core-shell arrangement similar to multiwall nanotubes.

As, mentioned, at least one inner shell typically includes a high capacity material of a type further described below. However, a core and other shells may also contribute to an overall capacity of the nanostructure. In certain embodiments, the selection of materials and dimensions for each component of a nanostructure is such that one or more inner shells containing high capacity materials provide at least about 50% of the overall nanostructure capacity or, in more specific embodiments, at least about 75% or at least about 90%.

Cores of core-shell structures may be used as a template for depositing one or more layers, and one of these layers may include a high capacity active material. This template may be rooted to a conductive substrate to provide mechanical attachment and electrical conductivity. This template core may be grown from the conductive substrate, which may include a source material layer used during growth of the templates structures.

Figure 3:
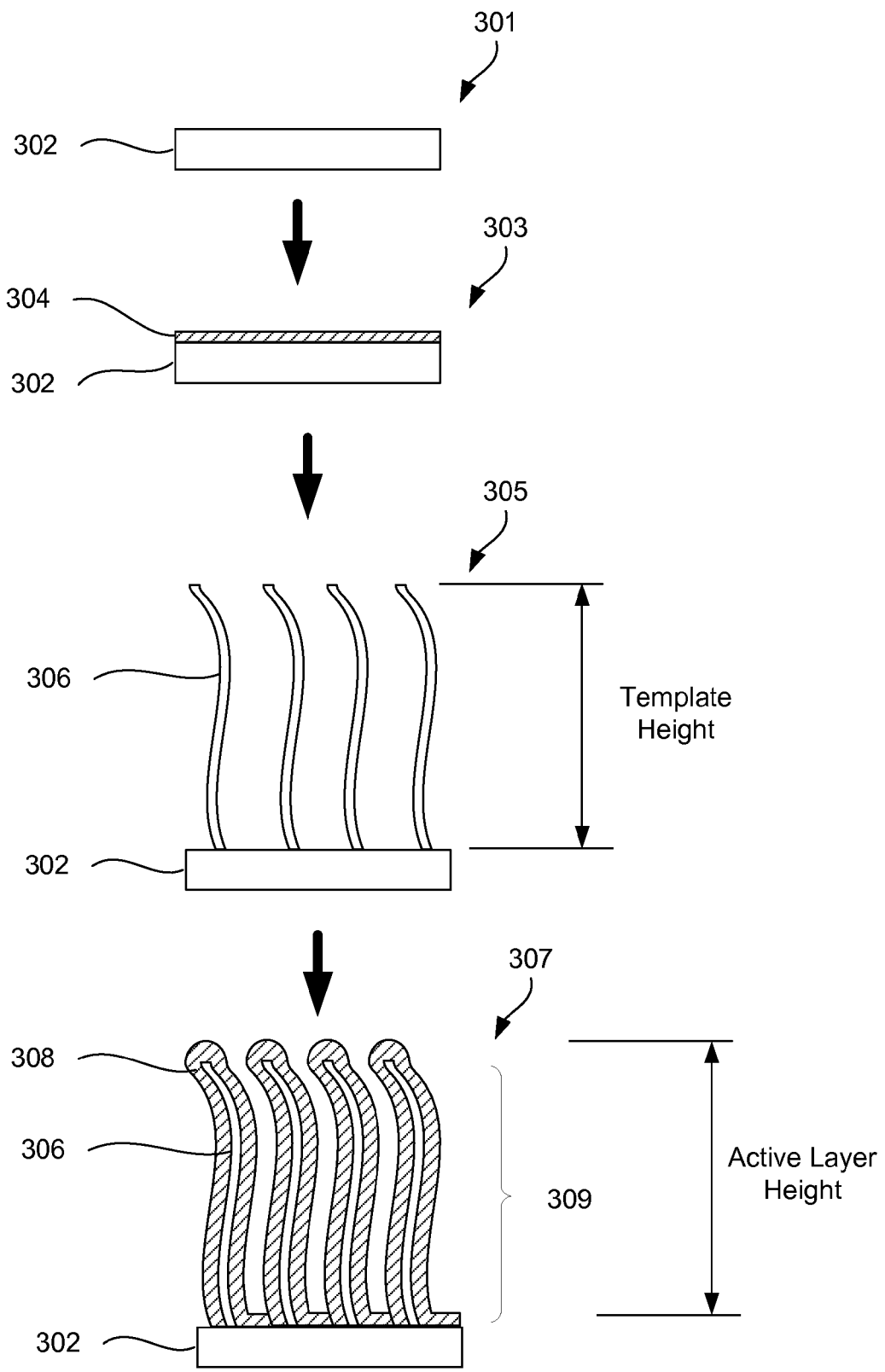
FIG. 3 is a schematic representation of an electrode structure during different stages of its fabrication, in accordance with certain embodiments.

FIG. 3 is a schematic representation of an electrode structure during different stages of its fabrication, in accordance with certain embodiments. Substrate 302 may be provided during an initial stage 301. Substrate 302 may include a base material and a metal source material consumed during formation of template cores. In certain materials, the base material is also a source material. In other embodiments, two different materials are used with a source material forming a top layer over the base. Substrate 302 may be then treated to form a surface 304 that is suitable to form silicide nanostructures shown in stage 303. For example, treated surface 304 may have a certain degree of roughness and include specific nucleation sites for forming template structures. Surface 304 may also include masking materials. In certain applications, source materials and/or treated surfaces are formed on both sides of the substrate 302.

Silicide nanostructures 306 are then formed on the substrate 302 as shown in stage 305. In certain embodiments, silicide nanostructures 306 have their ends rooted to the substrate 302. Silicide nanostructures form a high surface area template that is used for depositing an active material. Finally, an active material layer 308 is deposited over the silicide nanostructures 306 as shown in stage 307. Silicide nanostructures 306 can provide both mechanical support to the active material 308 and electrical connection to the substrate 302. While some contact may exist between the active material and the substrate, it may not be sufficient from a battery performance perspective.

A combination of silicide nanostructures 306 and active material 308 may be referred to as an active layer 309. Generally, the active layer 309 is adjacent to substrate 302 as shown in FIG. 3. Overall, active layer 309 may be characterized by its height, which is typically close to the height of the silicide template or, in specific embodiments, to the length of the nanowires making this template. In certain embodiments, a height of the active layer is between about 10 micrometers and 50 micrometers or, more specifically, between about 20 micrometers and 40 micrometers. Furthermore, active layer 309 may be characterized by its porosity (e.g., at least about 25% or, more specifically, at least about 50% or, even more specifically, at least about 75%), its capacity per unit area, and other characteristics.

Generally, the template material is highly electronically conductive and mechanically stable in the face of stresses experienced from expansion and contraction of active materials during cycling. Examples of suitable template materials include metal silicides (e.g., copper silicides, nickel silicides, aluminum silicides), carbon, certain metal or semiconductor oxides (e.g., zinc oxide, tin oxide, indium oxide, cadmium oxide, aluminum oxide, titania/titanium dioxide, silicon oxides), and certain metals (copper, nickel, aluminum). In particular embodiments, template structures are formed into nanowires and include silicides. Silicide nanowires may have a variable material composition along their lengths (i.e., higher source material concentrations at the rooted (proximal) ends where more source material is available than near the free (distal) ends of the nanowires). Depending on a source material type, this variability may be reflected in different morphological and stoichiometric phases of silicides. For example, nickel silicide nanowires may include one, two, or all three phases of nickel silicide (i.e., Ni2Si, NiSi, and NiSi2) It is believed that higher nickel content phases form stronger bonds with nickel metal. Therefore, this variability may provide relatively strong adhesion of nickel silicide nanowires to the base layer and thereby reduce the contact resistance. The conductivity and lithium irreversibility of these different nickel silicide phases also varies.

In certain embodiments, template nanowires may have wider bases (i.e., be cone shaped nanowires). Cone shaped nanowires may result from, for example, greater availability of the metal near the substrate/support rooted ends of the nanowires. In certain embodiments, an average diameter near the substrate/support rooted ends is at least about twice that near the free end. That is, the bases of the nanowires may be large enough to touch one another at the proximal ends on the surface of the substrate, but the distal tips are free and unconnected because of a decrease in diameter along the structure from the base to the tip. In more specific embodiments, a ratio of diameters between the proximal and distal nanowire ends is at least about 4 or, more particularly, at least about 10. Wider bases may help to maintain adhesion to the substrate.

The template examples described above generally refer to templates attached to planar substrates, such as metal foils. However, base structures that support template structure may have other shapes, such as meshes, foams, and particles. When particles are used as bases, template structures may be formed in all direction away from such bases. Such templates structures may be then coated with high capacity active materials to form multidimensional electrochemically active structure.

Figure 4:
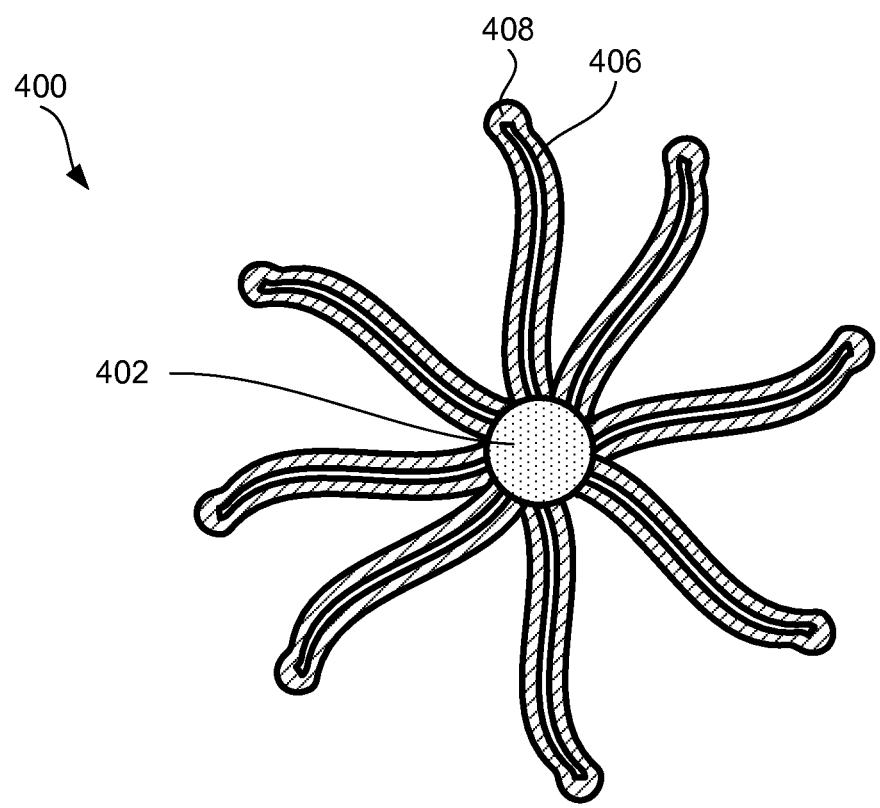
FIG. 4 is a schematic representation of a multidimensional electrochemically active structure, in accordance with certain embodiments.

FIG. 4 is a schematic two-dimensional (2D) representation of a multidimensional electrochemically active structure 400, in accordance with certain embodiments. Multidimensional electrochemically active structure 400 includes a support structure 402, which may be a nanoparticle, nanowires, or any other type of nanostructure. Support structure 402 may include one or more source materials that are used during formation of nanowires 406. In certain embodiments, the entire support structure 402 is formed from the source material. In other embodiments, support structure 402 includes an inert base and source shell, and the materials contained in the shell are used to form template structures, such as nanowires.

Nanowires 406 are grown from support structure 402 and remain attached to support structure 402 during later processing and use in the battery. Nanowires are defined as structures that have an aspect ratio of greater than one, typically at least about 2 and more frequently at least about four. Nanowires 406 may extend into different directions (e.g., all three dimensions) away from support 402. Such a template structure may be fabricated by suspending support structure 402 and then partially formed template structures in a fluidized bed reactor. Such template structures may be later attached to the substrate by depositing high capacity active materials over the structure and substrate or by using a polymer binder. In other embodiments, support structure 402 may be positioned on a planar substrate and nanowires 406 are grown only into the space over the substrate surface. In certain embodiments, attachment to the substrate occurs during template structure formation and/or during deposition of the high capacity active material over the template structure.

Nanowires 406 are coated with an active material, which forms an active material layer 408. In certain embodiments, the density of nanowires 406 near support 402 prevents active materials layer 408 from coating support 402. Keeping the active material area away from support 402 may help to preserve connection between nanowires 406 and support 402. Multidimensional electrochemically active structure 400 may be then arranged into a battery electrode, together with other such structures, to achieve any desirable thickness.

Figure 5A:
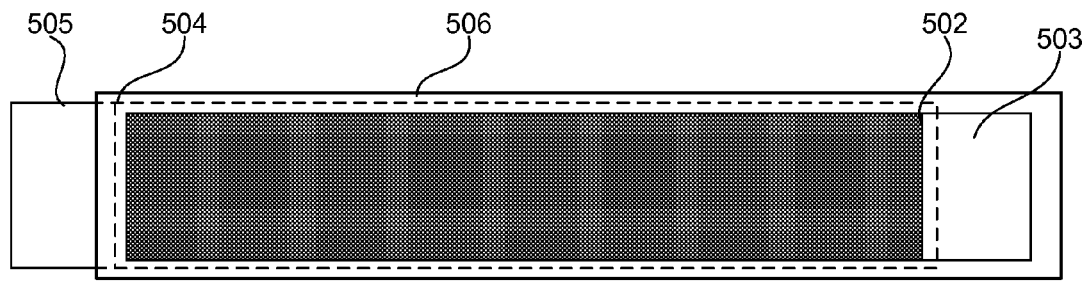
FIG. 5A is a plan view of a partially-assembled electrochemical cell that uses electrodes described herein, according to certain embodiments.

FIG. 5A is a plan view of a partially-assembled electrochemical cell that uses electrodes described herein, according to certain embodiments. The cell has a positive electrode active layer 502 that is shown covering a major portion of a positive current collector 503. The cell also has a negative electrode active layer 504 that is shown covering a major portion of a negative current collector 505. Separator 506 is between the positive electrode active layer 502 and the negative electrode active layer 504.

In one embodiment, the negative electrode active layer 504 is slightly larger than the positive electrode active layer 502 to ensure trapping of the lithium ions released from the positive electrode active layer 502 by the active material of the negative electrode active layer 504. In one embodiment, the negative electrode active layer 504 extends at least between about 0.25 millimeters and 5 millimeters beyond the positive electrode active layer 502 in one or more directions. In a more specific embodiment, the negative electrode active layer extends beyond the positive electrode active layer by between about 1 millimeter and 2 millimeters in one or more directions. In certain embodiments, the edges of the separator 506 extend beyond the outer edges of at least the negative electrode active layer 504 to provide the complete electronic insulation of the negative electrode from the other battery components.

Figure 5B:
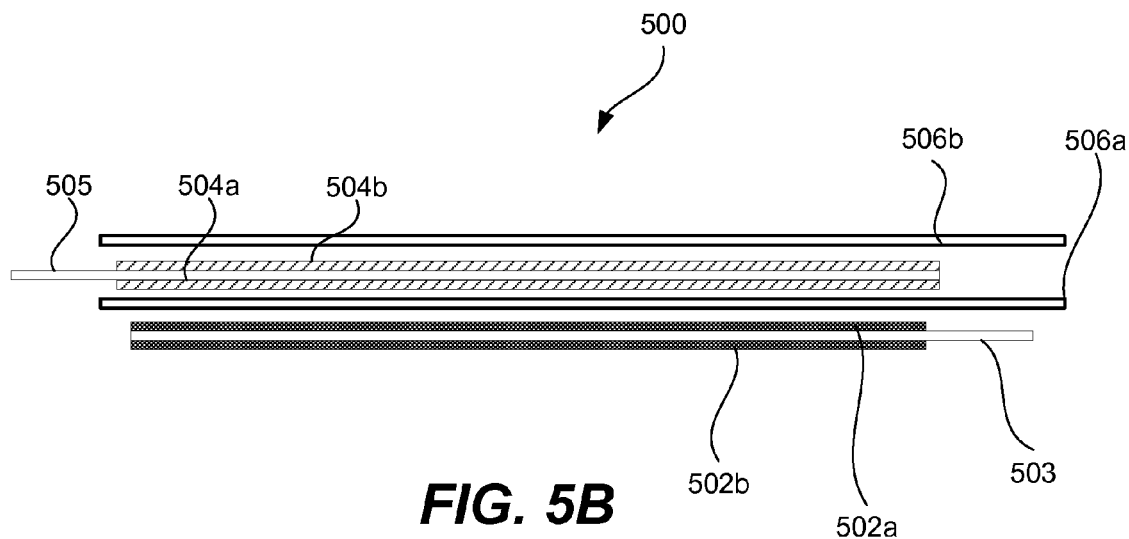
FIG. 5B is a cross-section view of an electrode stack 500 of the partially-assembled electrochemical cell that uses electrodes described herein, according to certain embodiments.

FIG. 5B is a cross-section view of an electrode stack 500 of the partially-assembled electrochemical cell that uses electrodes described herein, according to certain embodiments. There is a positive current collector 503 that has a positive electrode active layer 502a on one side and a positive electrode active layer 502b on the opposite side. There is a negative current collector 505 that has a negative electrode active layer 504a on one side and a negative electrode active layer 504b on the opposite side. There is a separator 506a between the positive electrode active layer 502a and the negative electrode active layer 504a. The separator sheets 506a and 506b serves to maintain mechanical separation between the positive electrode active layer 502a and the negative electrode active layer 504a and acts as a sponge to soak up the liquid electrolyte (not shown) that will be added later. The ends of the current collectors 503, 505, on which there is no active material, can be used for connecting to the appropriate terminal of a cell (not shown).

Together, the electrode layers 502a, 504a, the current collectors 503, 505, and the separator 506a can be said to form one electrochemical cell unit. The complete stack 500 shown in FIG. 5B includes the electrode layers 502b, 504b and the additional separator 506b. The current collectors 503, 505 can be shared between adjacent cells. When such stacks are repeated, the result is a cell or battery with larger capacity than that of a single cell unit.

Figure 6A:
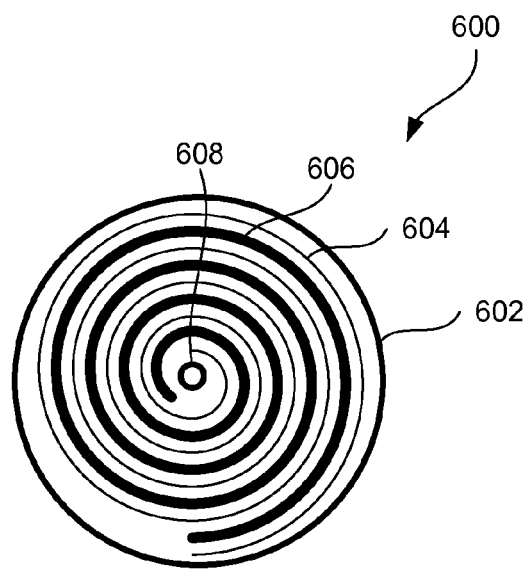
FIG. 6A is a schematic cross-section view of a jellyroll, in accordance with certain embodiments.
Figure 6B:
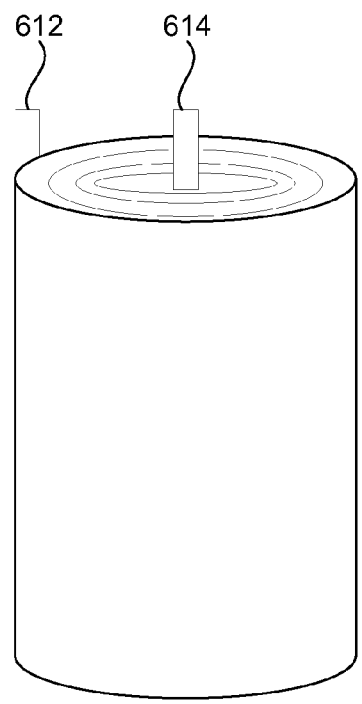
FIG. 6B is a schematic perspective view of a jellyroll, in accordance with certain embodiments.

Another way to make a battery or cell with large capacity is to make one very large cell unit and wind it in upon itself to make multiple stacks. The cross-section schematic illustration in FIG. 6A shows how long and narrow electrodes can be wound together with two sheets of separator to form a battery or cell, sometimes referred to as a jellyroll 600. The jellyroll is shaped and sized to fit the internal dimensions of a curved, often cylindrical, case 602. The jellyroll 600 has a positive electrode 606 and a negative electrode 604. The white spaces between the electrodes are the separator sheets. The jelly roll can be inserted into the case 602. In some embodiments, the jellyroll 600 may have a mandrel 608 in the center that establishes an initial winding diameter and prevents the inner winds from occupying the center axial region. The mandrel 608 may be made of conductive material, and, in some embodiments, it may be a part of a cell terminal. FIG. 6B shows a perspective view of the jelly roll 600 with a positive tab 612 and a negative tab 614 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650-type cell with 18 mm diameter and 65 mm length may have electrodes that are between about 300 and 1000 mm long. Shorter electrodes corresponding to lower rate/higher capacity applications are thicker and have fewer winds.

A cylindrical design may be used for some lithium ion cells, especially when the electrodes can swell during cycling and thus exert pressure on the casing. It is useful to use a cylindrical casing that is as thin as possible while still being able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets generally should be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 6C:
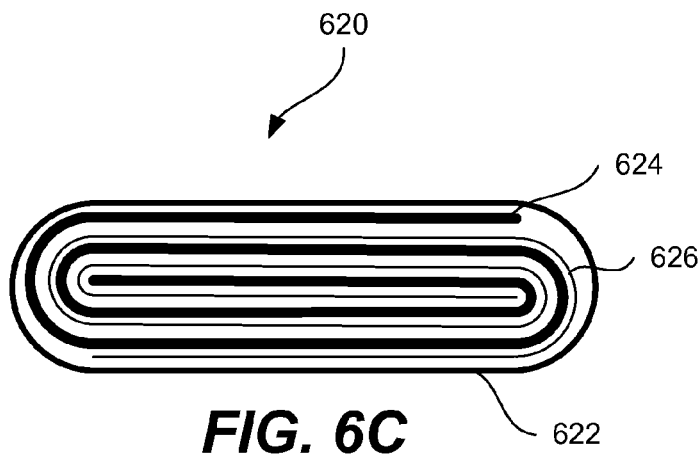
FIG. 6C is a schematic cross-section view of a prismatic wound cell, in accordance with certain embodiments.

FIG. 6C illustrates a top view of a wound prismatic jellyroll 620. The jellyroll 620 includes a positive electrode 624 and a negative electrode 626. The white space between the electrodes is the separator sheet. The jelly roll 620 is enclosed in a rectangular prismatic case 622. Unlike the cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 7A:
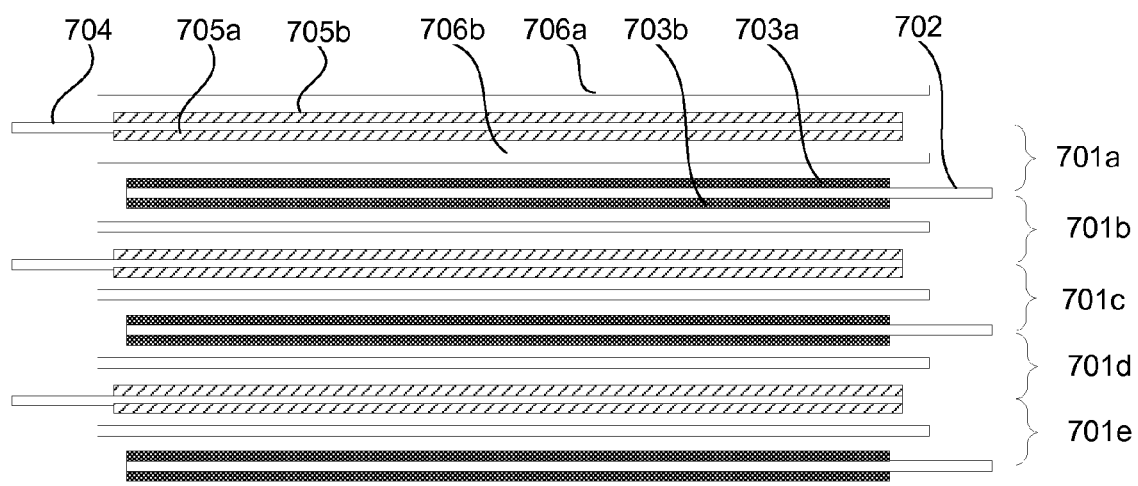
FIG. 7A is a schematic cross-section view of a stacked cell, in accordance with certain embodiments.
Figure 7B:
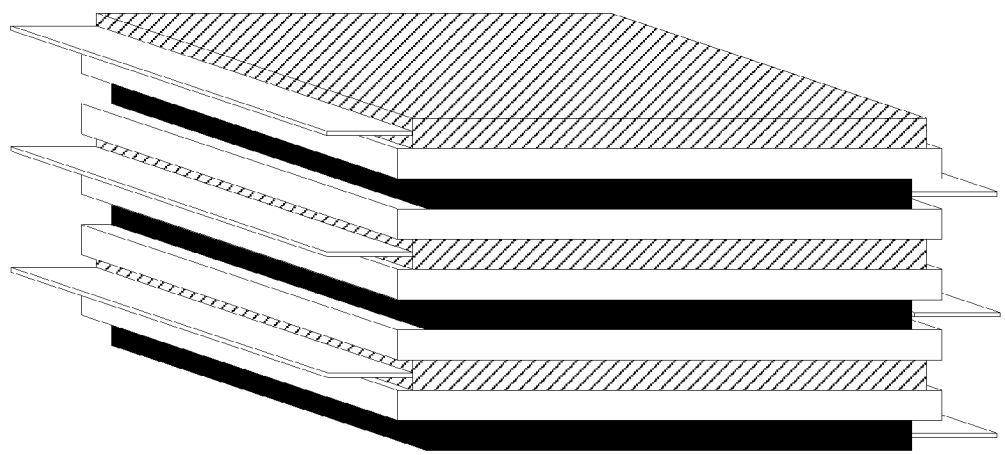
FIG. 7B is a schematic perspective view of a stacked cell, in accordance with certain embodiments.

FIG. 7A illustrates a cross-section of a stacked cell that includes a plurality of cells (701a, 701b, 701c, 701d, and 701e), each having a positive electrode (e.g., 703a, 703b), a positive current collector (e.g., 702), a negative electrode (e.g., 705a, 705b), a negative current collector (e.g., 704), and a separator (e.g., 706a, 706b) between the electrodes. Each current collector is shared by adjacent cells. A stacked cell can be made in almost any shape, which is particularly suitable for prismatic batteries. The current collector tabs typically extend from the stack and lead to a battery terminal. FIG. 7B shows a perspective view of a stacked cell that includes a plurality of cells.

Figure 8:
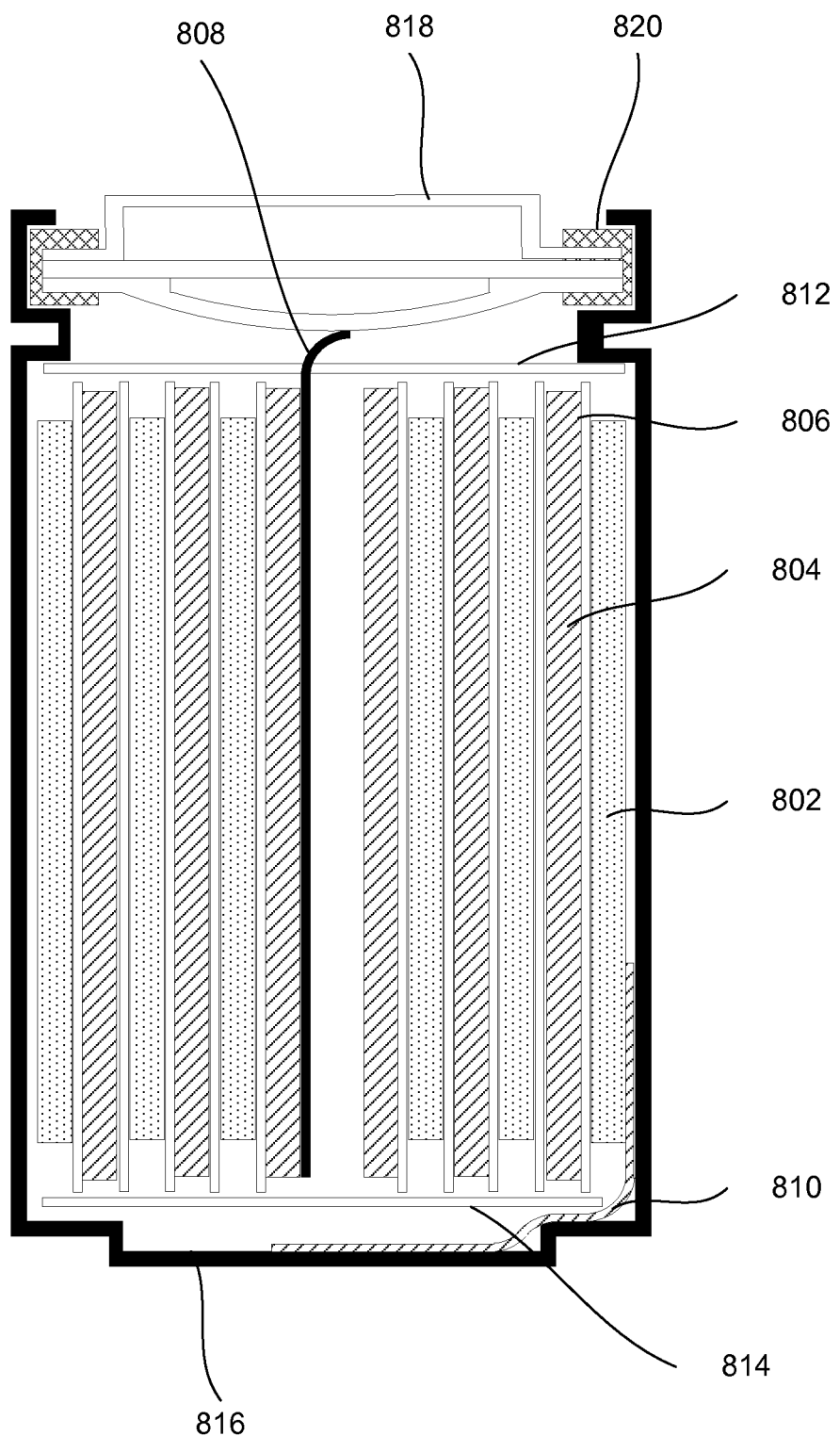
FIG. 8 is a cross-section view of the wound cylindrical cell, in accordance with certain embodiments.

FIG. 8 illustrates a cross-section view of the wound cylindrical cell, in accordance with one embodiment. A jelly roll includes a spirally wound positive electrode 802, a negative electrode 804, and two sheets of the separator 806. The jelly roll is inserted into a cell case 816, and a cap 818 and gasket 820 are used to seal the cell. In some cases, cap 818 or case 816 include a safety device. For example, a safety vent or burst valve may be employed to break open if excessive pressure builds up in the battery. Also, a positive thermal coefficient (PTC) device may be incorporated into the conductive pathway of cap 818 to reduce the damage that might result if the cell suffered a short circuit. The external surface of the cap 818 may be used as the positive terminal, while the external surface of the cell case 816 may serve as the negative terminal. In an alternative embodiment, the polarity of the battery is reversed and the external surface of the cap 818 is used as the negative terminal, while the external surface of the cell case 816 serves as the positive terminal. Tabs 808 and 810 may be used to establish a connection between the positive and negative electrodes and the corresponding terminals. Appropriate insulating gaskets 814 and 812 may be inserted to prevent the possibility of internal shorting. During fabrication, the cap 818 may be crimped to the case 816 in order to seal the cell. However, prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300-series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A lithium ion battery comprising:
an electrode comprising an electrochemically active material selected from the group consisting of a silicon containing material, a tin containing material, a germanium containing material, and an aluminum containing material;
an electrolyte comprising a lithium containing salt, a pyrocarbonate, and one or more fluorinated carbonate solvents;
and a solid electrolyte interphase (SEI) layer that includes fluorine, wherein the electrode comprising an electrochemically active material includes core-shell nanostructures that include an inner shell and an outer shell; and wherein the SEI layer is formed on the outer shell, the nanostructures having at least one cross-sectional dimension between 1 and 1000 nm.

2. The lithium ion battery of claim 1, wherein the pyrocarbonate is selected from the group consisting of dimethyl pyrocarbonate, diethyl pyrocarbonate, dipropyl pyrocarbonate, dibutyl pyrocarbonate, and ethylmethyl pyrocarbonate.

3. The lithium ion battery of claim 1, wherein the pyrocarbonate is dimethyl pyrocarbonate.

4. The lithium ion battery of claim 1, wherein the electrochemically active material comprises elemental silicon.

5. The lithium ion battery of claim 1, wherein the electrochemically active material comprises a silicon alloy.

6. The lithium ion battery of claim 1, wherein the electrode comprises nanostructures, the nanostructures comprising the electrochemically active material.

7. The lithium ion battery of claim 6, wherein the nanostructures comprise nanowires.

8. The lithium ion battery of claim 7, wherein an outer surface of the nanowires comprise elemental silicon, silicon oxide, silicon alloy, or silicide.

9. The lithium ion battery of claim 1, wherein the electrochemically active material comprises silicon, wherein the lithium ion battery exhibits an average Coulombic efficiency of at least 99.8% after about 100 cycles during a cycling test; and
wherein the cycling test comprises charging the lithium ion battery to at least about 1050 mAh/g at a rate of at least about C/2 and discharging to 900 mV versus lithium metal at a rate of at least about C/2 in each cycle.

10. The lithium ion battery 1, wherein the electrolyte comprises one or more pyrocarbonates that have a total concentration in the electrolyte of less than about 50% by weight.

11. The lithium ion battery 1, wherein the electrolyte comprises one or more pyrocarbonates that have a total concentration in the electrolyte of between about 1% and 10% by weight.

12. The lithium ion battery of claim 1, wherein the one or more fluorinated carbonate solvents are selected from the group consisting of mono-fluoroethylene carbonate, fluoropropylene carbonate, difluoroethylene carbonate, and fluoromethylethylene carbonate.

13. The lithium ion battery of claim 1, wherein the one or more fluorinated carbonate solvents comprises mono-fluoroethylene carbonate (FEC).

14. The lithium ion battery of claim 1, wherein the one or more fluorinated carbonate solvents have a total concentration in the electrolyte of less than about 50% by weight.

15. The lithium ion battery of claim 14, wherein the one or more fluorinated carbonate solvents have a total concentration of less than about 10% by weight.

16. A lithium ion battery electrolyte for use in a lithium ion battery containing high capacity active materials, the lithium ion battery electrolyte comprising:
a lithium containing salt;
a solvent substantially free from linear carbonates;
dimethyl pyrocarbonate (DMPC);
and one or more fluorinated carbonate solvents substantially free from linear carbonates, wherein the DMPC is present in the lithium battery electrolyte at a concentration between 5% and 10% by weight and wherein the one or more fluorinated carbonates are present in the lithium ion battery electrolyte at a concentration of between about 1% and 10% by weight.

17. The lithium ion battery electrolyte of claim 16, wherein at least one of the one or more fluorinated carbonate solvents is selected from the group consisting of mono-fluoroethylene carbonate, fluoropropylene carbonate, difluoroethylene carbonate, and fluoromethylethylene carbonate.

18. The lithium ion battery electrolyte of claim 17, wherein the one or more fluorinated carbonate solvents comprise mono-fluoroethylene carbonate (FEC).

19. The lithium ion battery electrolyte of claim 16, wherein the solvent is selected from the group consisting of ethylene carbonate (EC), dimethyl carbonate (DMC), diethyl carbonate (DMC), and/or ethyl-methyl carbonate (EMC).

20. The lithium ion battery electrolyte of claim 16, wherein the lithium containing salt is selected from the group consisting of lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium bis(oxalato)borate (LiBOB), lithium oxalyldifluoroborate (LiODFB), $LiPF_3(CF_2CF_3)_3$ (LiFAP), and $LiBF_3(CF_2CF_3)_3$ (LiFAB).

21. The lithium ion battery electrode of claim 1, wherein the electrolyte consists of one or more carbonate solvents, one or more lithium-containing salts, and one or more additives, the one or more additives including the pyrocarbonate.

22. The lithium ion battery electrode of claim 1, wherein the electrolyte comprises one or more pyrocarbonates that have a total concentration in the electrolyte of between 5% and 10% by weight.

23. The lithium ion battery of claim 1, wherein the solvent is substantially free from linear carbonates.

* * * * *